Patented July 20, 1948

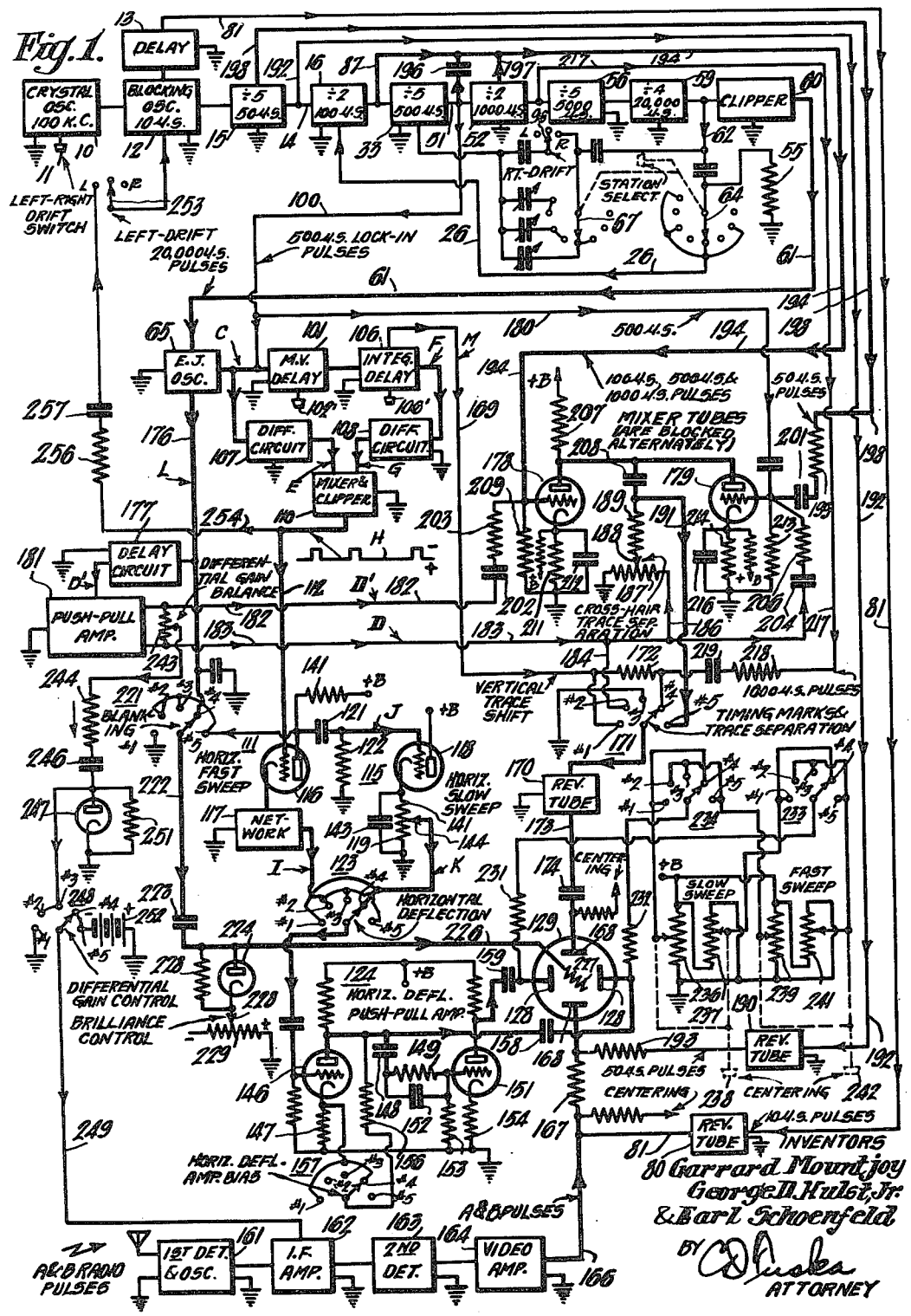

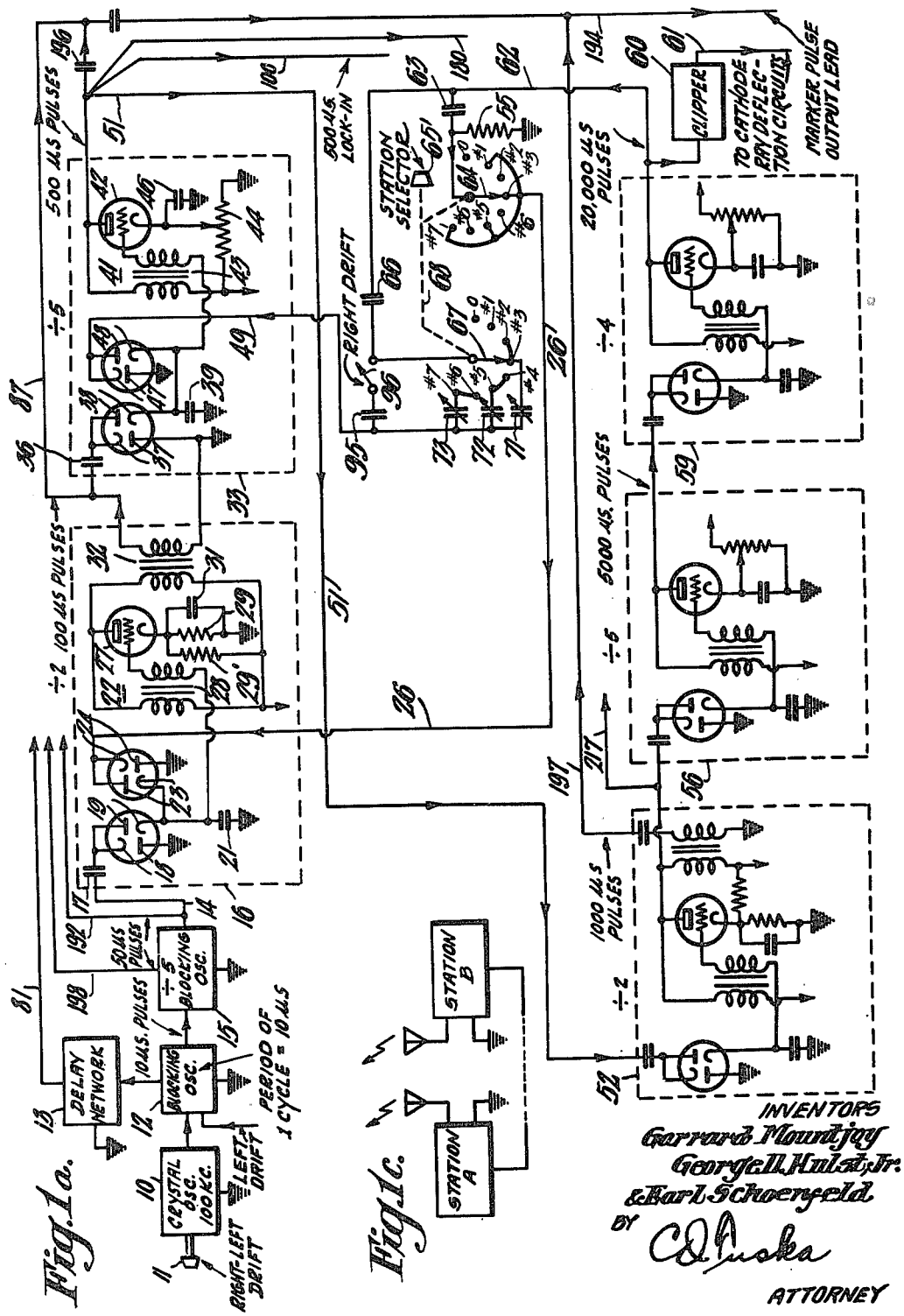

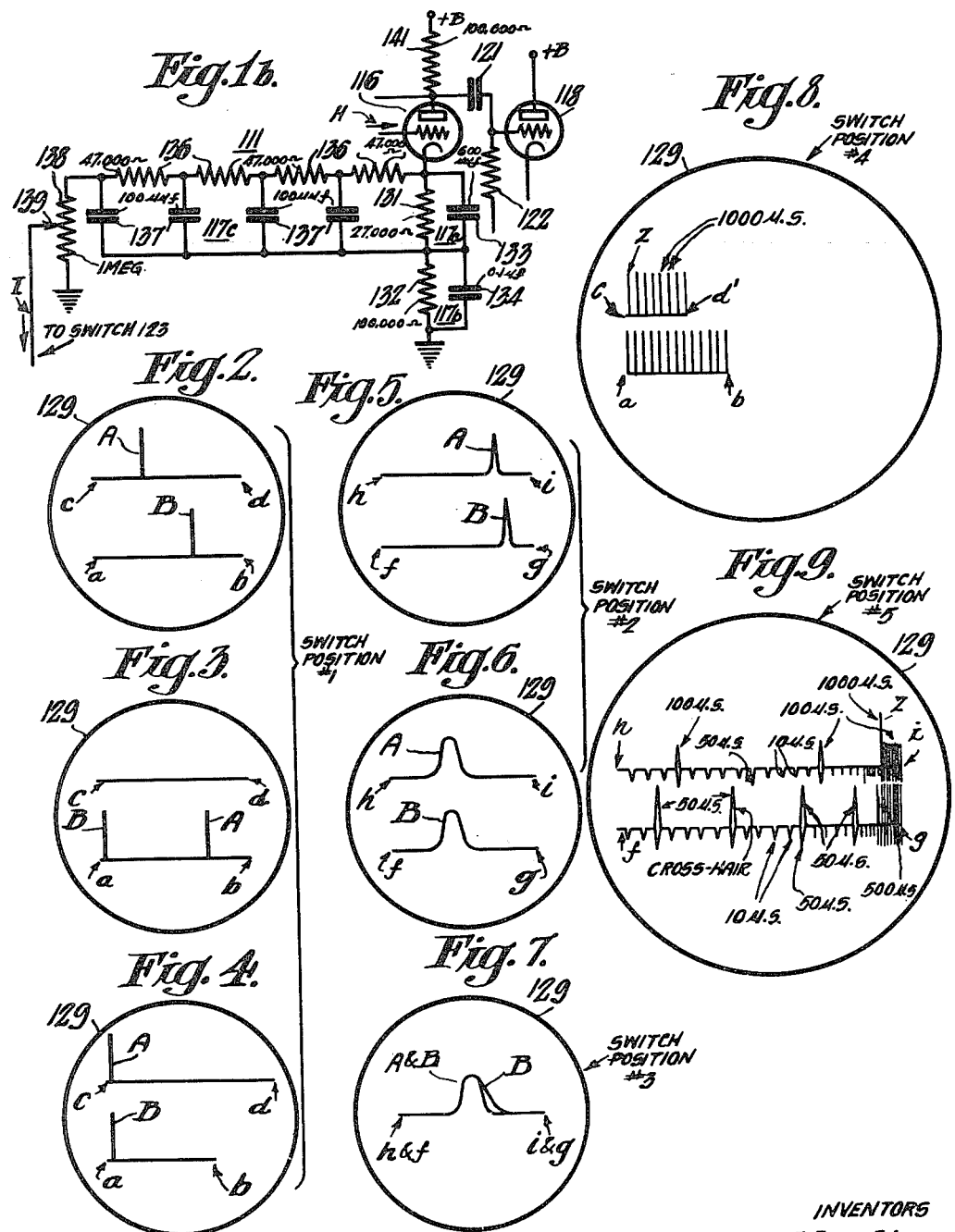

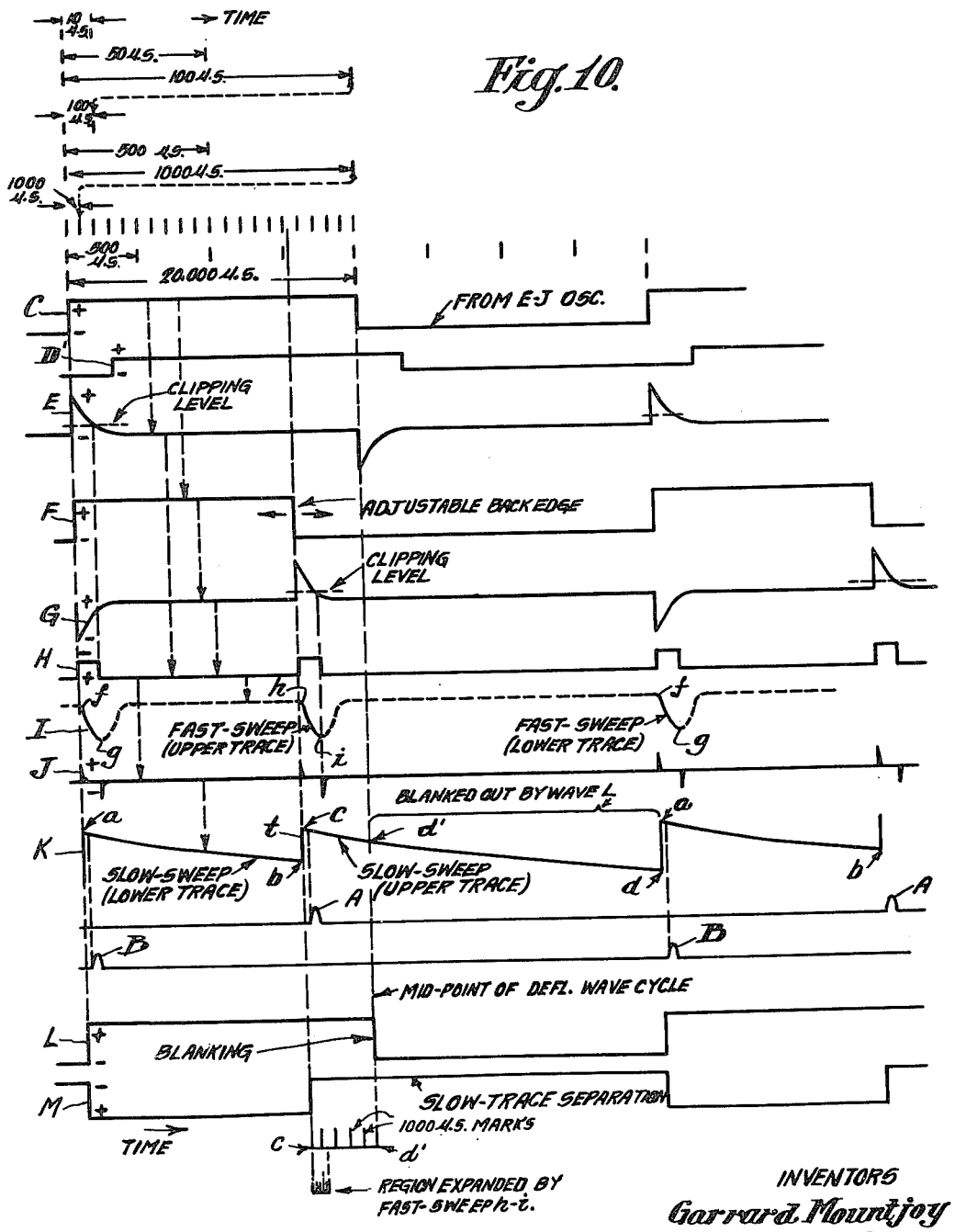

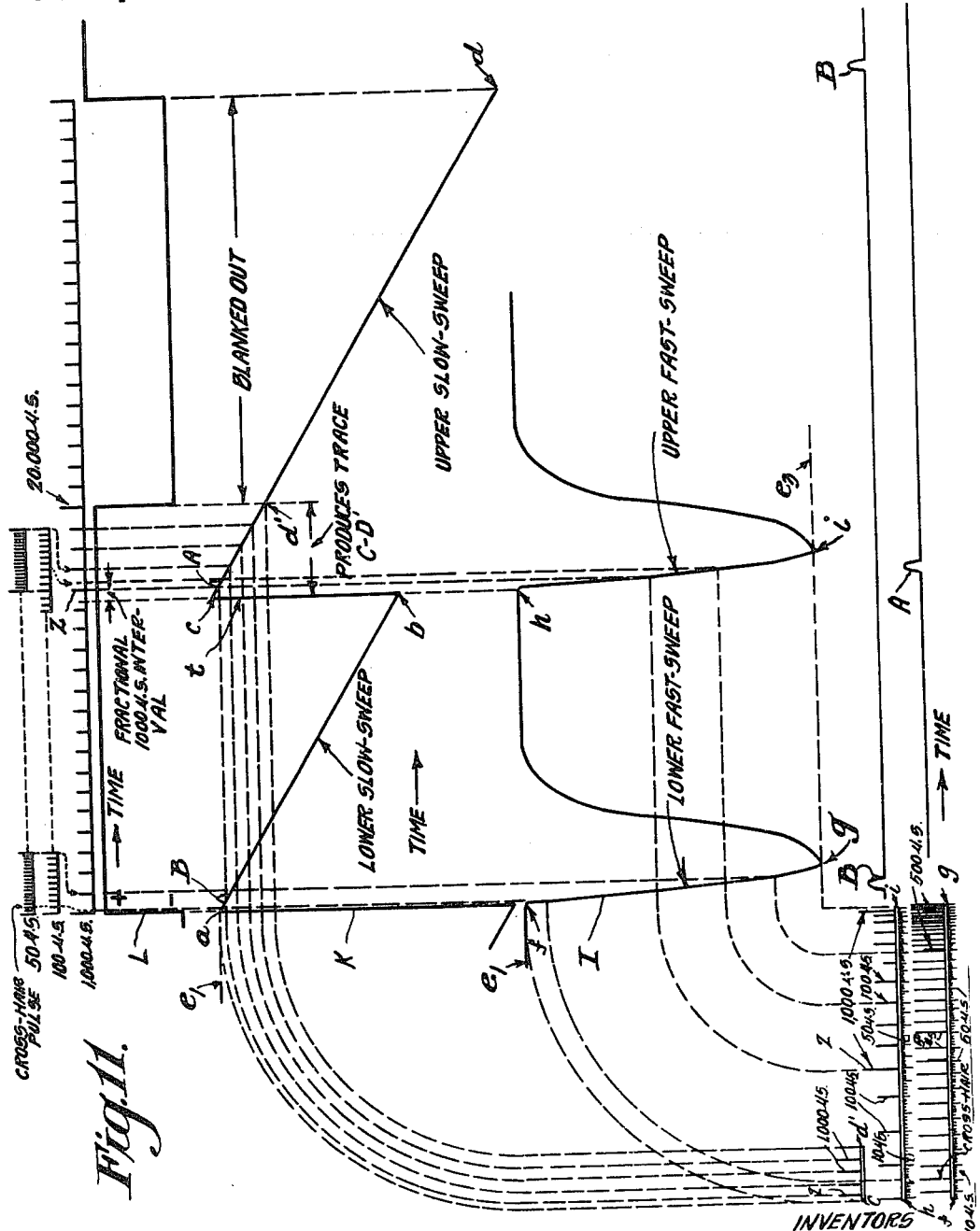

2,445,361

UNITED STATES PATENT OFFICE 2,445,361

RADIO NAVIGATION SYSTEM

Garrard Mountjoy, Manhasset, N. Y., George D. Hulst, Jr., Upper Montclair, N. J., and Earl Schoenfeld, Mamaroneck, N. Y., assignors to Radio Corporation of America, a corporation of Delaware Application April 20, 1945, Serial No. 589,320

20 Claims. (Cl. 343—103)

Our invention relates to radio navigation systems and particularly to systems of the type utilizing the time difference in the propagation of radio pulses from synchronized ground stations.

Navigation systems of this type employ pairs of synchronized ground stations that transmit radio pulses having at the instant of radiation a fixed time relation to each other. Each pair of ground stations preferably transmits pulses at its individual assigned repetition rate for the purpose of station selection. The pulses are radiated to receiving equipment located on the aircraft or ship whose position is to be determined. By means of the receiving equipment, the operator on the craft determines the time difference between the pulses from the two transmitter stations of one pair as they arrive at the receiver. Since the radio pulses travel from the ground transmitters to the receiver at a known propagation rate (i. e., at the velocity of light), it is known that the position of the craft is at some point on a line corresponding to the time difference reading. By obtaining the time difference reading from a second pair of ground stations, a second line corresponding to the second time difference reading is obtained, and the intersect point of the two lines is the position of the craft. Special maps having "time difference" lines printed thereon for the several pairs of ground stations are provided for use with the navigation system.

In order to measure the time difference in the arrival of successive pulses from a pair of ground stations, timing marker pulses that have a known time interval between them are generated. Also, pulses having a definite time relation to the time marker pulses are generated for the purpose of driving or synchronizing cathode-ray deflecting circuits. These deflecting circuits produce cathode-ray sweep traces on which the marker pulses and/or the received ground station pulses appear.

For the purpose of selecting a particular pair of ground stations, the operator selects a particular pulse repetition rate for the driving or synchronizing pulses corresponding to the repetition period of the pulses transmitted from said pair whereby the deflecting circuits may be synchronized with the received pulses from the selected pair of ground stations. Thus a particular pair of ground stations is selected at the receiver apparatus by turning a station selection switch to the position indicated on the receiver panel for obtaining sweep synchronizing pulses having the same repetition period as that of the pulses being transmitted from the selected pair of ground stations. Now the received pulses from the selected pair of ground stations can be made to appear stationary on the cathode-ray sweep or trace whereas those received from the other pairs of ground stations will move rapidly along the same trace.

In operation, the pulses from the two transmitter stations of a selected pair of stations (which pulses will be referred to as A and B pulses, respectively) are made to appear on two cathode-ray traces, respectively. The B pulse is identified as the pulse that occurs after or follows the mid-point of the other pulse period, or, in some systems, may be otherwise identified. The A and B pulses are brought into alignment or coincidence by moving the A pulse along its cathode-ray sweep trace, this being done by adjusting the starting time of the cathode-ray sweep. It is then possible to measure the time displacement of the sweep required for pulse alignment. This may be done, for example, by blanking out the portion of the adjustable trace from the center of the deflecting wave cycle and by counting 1000 $\mu$s. timing markers appearing on the remaining portion of the trace. Thus, the desired time difference between pulses is determined to a fractional 1000 $\mu$s. period. A precise determination of the fractional 1000 $\mu$s. period is made possible by employing a second cathode-ray sweep that is fast and which occurs at the start of the unblanked portion of the slow-sweep trace and lasts for the said fractional period whereby 10 $\mu$s. and 100 $\mu$s. timing marks occurring during the fractional period appear on an expanded trace.

An object of the present invention is to provide an improved method of and means for determining the time difference between electrical pulses.

A further object of the invention is to provide improved receiving equipment for a radio navigation system of the type utilizing the propagation of radio pulses from pairs of synchronized ground stations.

A still further object of the invention is to provide an improved method of and means for indicating the time difference between radio pulses transmitted from synchronized ground stations.

A still further object of the invention is to provide an improved method of and means for obtaining a simple time marker presentation in a radio navigation system of the above-mentioned type.

The invention will be better understood from the following description taken in connection with the accompanying drawing in which Figure 1 is a block and circuit diagram of navigation receiving apparatus designed in accordance with one embodiment of the invention, Figure 1a is a block and circuit diagram of the pulse generating unit shown in Fig. 1, Figure 1b is a circuit diagram of the horizontal deflecting fast-sweep circuit employed in the system of Fig. 1, Figure 1c is a block diagram representing one pair of ground radio transmitter stations of the navigation system which transmit A and B pulses, respectively, Figures 2, 3 and 4 are views of the slow-sweep cathode-ray traces appearing on the screen end of the cathode-ray indicator tube that is included in the apparatus of Fig. 1 and of the received pulses A and B as they appear on the two traces, respectively, during successive steps in aligning the pulses A and B, Figures 5 and 6 are views of the fast-sweep cathode-ray traces on the cathode-ray tube indicator and of the received pulses A and B as they appear on the two fast-sweep traces, respectively, during the next successive steps in obtaining more exact alignment of the A and B pulses, Figure 7 is a view showing the fast-sweep traces of Fig. 6 superimposed or collapsed for the final alignment step and showing the A and B pulses exactly aligned and superimposed.

Figure 8 is a view of the two slow-sweep traces on the cathode-ray tube indicator screen with a portion of the upper trace blanked out and with the 1000 $\mu$s. timing marks on the traces for obtaining the time reading in 1000 $\mu$s. intervals, Figure 9 is a view of the two fast-sweep traces on the cathode-ray indicator tube screen with 1000 $\mu$s., 100 $\mu$s. and 10 $\mu$s. timing marks on the upper trace and with a 50 $\mu$s. cross-hair mark on the lower trace for obtaining the time reading of the fractional 1000 $\mu$s. intervals, Figure 10 is a group of graphs that are referred to in explaining the operation of the system shown in Fig. 1, and Figure 11 is a view showing the relation of the cathode-ray trace with respect to the horizontal deflecting waves and also with respect to the timing marker pulses.

In the several figures, similar parts are indicated by similar reference characters.

The pulse generator and station selection circuit which will now be described under the headings "The pulse generator unit" and "Count subtraction for station selection" is the same as that described and claimed in application Serial No. 552,146, filed August 31, 1944, in the name of Earl Schoenfeld and entitled Timing marker and station selection apparatus.

THE PULSE GENERATOR UNIT

In Fig. 1, the pulse generating circuit for producing the timing marker pulses and for producing the controlling or synchronizing pulses that control the cathode-ray deflection is shown in block diagram at the top of the figure. It is shown in detail in Fig. 1a. Referring to Figs. 1 and 1a, the pulse generator comprises a crystal oscillator 10 that produces a sine wave voltage of stable frequency which in the example illustrated is 100 kilocycles per second, the repetition period being 10 microseconds. The frequency of the crystal oscillator output may be increased or decreased slightly by a manual adjustment as indicated at the control knob 11 for obtaining a "fine" right or left drift of a received pulse on a cathode-ray sweep trace, the rate of drift being slow enough to be useful on fast-sweep presentation.

The crystal oscillator 10 drives a blocking oscillator 12 or the like to produce periodic pulses which, in the present example, also recur at the rate of 100 k. c. per second. The repetition period or time interval between successive pulses is, therefore, 10 microseconds.

The frequency of the 10 $\mu$s. pulses is divided by five by means of a suitable frequency divider 15 such as a second blocking oscillator to produce 50 $\mu$s. pulses. While specific values are being given for the several frequency division steps, the invention is not limited to these particular values.

The 50 $\mu$s. pulses are applied through a lead 14 to a frequency divider 16 of the counter type described in White Patent 2,113,011. It divides the frequency by two to produce 100 $\mu$s. pulses. Also, an additional circuit is provided so that the divider 16 may be made to lose a "count" for the purpose of obtaining a different selected pulse repetition period.

The divider 16 comprises a counter circuit portion including an input or "bucket" capacitor 17, a pair of diodes 18 and 19, a "storage" capacitor 21 and a blocking oscillator portion 22. In addition, it includes a pair of diodes 23 and 24 associated with the storage capacitor 21 for the purpose of making the divider 16 lose a count upon the application of a pulse from a conductor 26 as will be explained hereinafter. The blocking oscillator 22 comprises a vacuum tube 27 and a transformer 28 coupling the plate circuit to the grid circuit. The cathode circuit includes a biasing resistor 29, bypassed by a capacitor 31, and connected in series with a bleeder resistor 29'. A transformer 32 supplies the 100 $\mu$s. pulses from the divider 16 to a frequency divider 33 which also is of the type which may be made to lose a "count."

The frequency divider 16 operates as follows: Each of the 50 $\mu$s. pulses of positive polarity from the lead 14 puts a predetermined charge on the comparatively large capacity storage capacitor 21 as a result of a pulse of current through the comparatively small "bucket" capacitor 17 and through the diode 19, the capacity of the capacitor 17 being small enough so that capacitor 17 receives full charge before the termination of an applied pulse. At the end of this current pulse, the capacitor 17 is discharged to ground potential through the diode 18. The next 50 $\mu$s. pulse puts an additional current pulse into capacitor 21, this raising the voltage across capacitor 21 sufficiently to trigger the blocking oscillator 22 whereby a pulse is produced across the transformer 28 as is well understood in the art. The pulse thus produced is applied to the divider 33 with positive polarity. At the same time the blocking oscillator 22 discharges the capacitor 21 to bring it back to ground potential.

The frequency divider 33 divides the frequency by five to produce 500 $\mu$s. pulses. It includes a counter portion comprising a "bucket" capacitor 36, a pair of diodes 37 and 38, and a storage capacitor 39. It also includes a blocking oscillator portion 41 comprising a vacuum tube 42, a feedback tranformer 43, a biasing resistor 44 and a bypass capacitor 46.

As in the preceding divider 16, there is provided in the divider 33 a pair of diodes 47 and 48 for subtracting counts. In the divider 33, however, the application of a pulse from a conductor 49 will subtract one, two or three counts depending upon the position of the station selection switch.

The 500 μs. pulses are supplied over a conductor 51 to a frequency divider 52 that divides by two to produce 1000 μs. pulses. The divider 52 is similar to the divider 16 with the count subtracting diodes omitted.

The 1000 μs. pulses are supplied to a frequency divider 56 that divides by five to produce 5000 μs. pulses which, in turn, are supplied to a frequency divider 59 that divides by four to produce 20,000 μs. pulses. The dividers 56 and 59 are similar to the divider 52 except for the difference in circuit constants.

The 20,000 μs. pulses may be passed through a clipping circuit 60 and supplied over a conductor 61 to a square wave generator 65 (Fig. 1), such as an Eccles-Jordan oscillator, for obtaining a square wave having a repetition period of 40,000 μs. From this square wave are obtained, by means of suitable wave shaping and delay circuits described hereinafter, the desired driving or synchronizing pulses for the horizontal deflection.

The 20,000 μs. pulses are also supplied over a conductor 62 and through a "bucket" capacitor 63 of the first count subtraction circuit to a station selection switch 64; they are also supplied to the second count subtraction circuit through a coupling or blocking capacitor 66 of large capacity to a second station selection switch 67 which is ganged with the switch 64 as indicated by the broken line 68, the two switches being operated by a knob 65'.

At the switch 64, alternate switch contact points are connected to the feedback conductor 26 whereby at these switch point positions the 20,000 μs. pulses are fed back to the divider 16 to subtract counts. It may be desirable because of distributed or stray leakage in the switch 64 or capacitors 63 to connect the switch arm 64 to ground through a 1 megohm resistor 55 to permit charges to leak off.

At the switch 67, the last six switch contact points are connected in pairs, the three pairs of contact points #2—#3, #4—#5 and #6—#7 being connected through "bucket" capacitors 71, 72 and 73, respectively, to the feedback conductor 49 which leads to the second count subtraction circuit. Thus, with switch 67 in any one of the last six positions, 20,000 μs. pulses are applied to the divider 33 to subtract counts.

Before discussing in detail the operation of the count subtracting circuits for station selection, it may be noted that the desired timing marker pulses are obtained at various points along the frequency divider circuit. In the present system, the 10 μs. pulses are supplied from the blocking oscillator 12 through a delay network 13 to an output lead 81. 50 μs. pulses of opposite polarities are supplied to leads 192 and 198. The 100 μs., 500 μs. and 1000 μs. pulses are supplied to a common output lead 194. 1000 μs. pulses of opposite polarity are supplied to an output lead 217. The marker pulses are applied through circuits hereinafter described to the vertical deflecting plates of a cathode-ray tube 129. The cathode ray of the tube 129 is deflected horizontally by either a slow-sweep or a fast-sweep deflecting wave that is in synchronism with the 40,000 μs. square wave from the Eccles-Jordan oscillator 65 (Fig. 1). It is evident that the 40,000 μs. horizontal deflection cycle has a fixed time relation to the timing marker pulses.

COUNT SUBTRACTION FOR STATION SELECTION

Referring now more particularly to the feature of subtracting counts for the purpose of station selection, specific pulse repetition rates for a plurality of pairs of ground transmitter stations will be referred to by way of example to aid in explaining the operation.

It will be assumed that the first pair of ground stations transmit the A pulses with a repetition period of 40,000 μs. and transmit the B pulses with a like repetition period; that the second pair of ground stations transmit A and B pulses having a repetition period of 39,900 μs.; that the third pair transmits 39,800 μs. pulses; that the fourth pair transmits 39,700 μs. pulses, etc. It is apparent that for station selection at the receiving apparatus, the operator must be able to select corresponding repetition periods for the output of the square wave generator 65 which controls the cathode ray deflection cycle; namely, periods of 40,000 μs.; 39,900 μs.; 39,800 μs.; 39,700 μs.; 39,600 μs.; etc.

It will be noted that several repetition periods differ from each other by 100 μs. or by integral multiples thereof, and that this corresponds to repetition period differences of 50 μs. or integral multiples thereof at the output of the frequency divider chain, i. e., at the input of the clipper 60. Therefore, the desired repetition period can be obtained by shortening the 20,000 μs. period by 50 μs., by 100 μs., by 150 μs., etc.

For example, to obtain the 39,900 μs. repetition period, the switches 64 and 67 are moved to the No. 1 switch contact points. At this switch position the 20,000 μs. pulses from the lead 62 are fed back by way of the "bucket" capacitor 63, the switch 64 and the conductor 26 to the frequency divider 16 only. Upon the occurrence of a 20,000 μs. pulse, it produces a pulse of current through the "bucket" capacitor 63 and through the diode 23 to add a charge to the storage capacitor 21. At the end of the pulse, the capacitor 63 discharges through the diode 24 to its original potential. By properly selecting the capacity value of the "bucket" capacitor 63, the added charge is made equal to the charge which is added to the capacitor 21 by a single 50 μs. pulse. Thus, the 20,000 μs. pulse causes the blocking oscillator 22 to fire one pulse earlier or 50 μs. sooner than it normally would whereby the desired repetition period of 19,950 μs. at the clipper 60 or 39,900 μs. at output of the E.-J. oscillator 65 is obtained. It may be noted that, in the example given, each time a 20,000 μs. pulse occurs, the divider 16 divides by one instead of by two.

To obtain the 39,800 μs. repetition period, the switches 64 and 67 are moved to position #2. Now the 20,000 μs. pulses are applied through the "bucket" capacitor 71 to the divider 33 and upon the occurrence of a 20,000 μs. pulse. It applies a charge to the capacitor 39 through the diode 48. At the end of the pulse the capacitor 71 discharges through the diode 47 to its original potential. The capacitor 71 is given a capacity value such that this charge applied by the 20,000 μs. pulse is equal to the charge applied by a single 100 μs. pulse. Thus, upon the occurrence of a 20,000 μs. pulse, the blocking oscillator 41 fires one pulse early or 100 μs. sooner than it normally would whereby the desired repetition period of 19,900 μs. is obtained at the clipper 60 and a repetition period of 39,800 μs. is obtained at the output of the E.-J. oscillator 65. It may be noted that in the example given, the divider 33 divides by four instead of by five upon the occurrence of each 20,000 µs. pulse.

To obtain the 39,700 µs. repetition period, the switches 64 and 67 are moved to the #3 position, this being the switch position shown in the drawing. Now the 20,000 µs. pulses are applied to both the divider 16 and the divider 33 through the switches 64 and 67 whereby both dividers lose a count. Specifically, the blocking oscillators 22 and 41 of dividers 16 and 33 fire 50 µs. and 100 µs. early, respectively, or a total of 150 µs. early. Thus, the desired repetition period of 2×19,850 µs. or 39,700 µs. is obtained at the E.-J. oscillator output.

To obtain the 39,600 µs. repetition period, the switches 64 and 67 are moved to the #4 position. Again the 20,000 µs. pulses are applied to the divider 33 only, but this time through the capacitor 72 which has a capacity value such that a 20,000 µs. pulse causes the divider 33 to lose two counts, i. e., to trigger 200 µs. early. Thus, the desired period of 2×19,800 µs. or 39,600 µs. is obtained at the E.-J. oscillator.

At the #5 switch position, the divider 16 again triggers 50 µs. early and the divider 33 triggers 200 µs. early or a total of 250 µs. for the two dividers. Thus, the repetition period is 19,750 µs. at the input to clipper 60 or 39,500 µs. at the output of the E.-J. oscillator 65.

At the #16 switch position, only the divider 33 receives the 20,000 µs. pulses. These pulses are applied through the capacitor 73 which is adjusted to make the divider 33 lose three counts. Thus, it triggers 300 µs. early to give a repetition period of 2×19,700 µs. or 39,400 µs. at the E.-J. oscillator output.

At the #7 switch position, both of the dividers 16 and 33 lose counts, divider 16 triggering 50 µs. early and divider 33 triggering 300 µs. early, or a total of 350 µs. whereby the repetition period is 19,650 µs. at the clipper 60 or 39,300 µs. at the E.-J. oscillator output.

It may be preferred to employ a different group of repetition periods than the group of 40,000 µs., 39,900 µs., etc. assumed above. By making the final divider stage 59 divide by three, for example, instead of by four, the divider chain output pulses have a repetition period of 15,000 µs. so that a group of repetition periods of 30,000 µs., 29,900 µs., etc. may be employed. Or the divider stage 59 may be made to divide by five to obtain a group of repetition periods of 50,000 µs., 49,900 µs., etc.

In order to obtain a more rapid right "drift" of the A and B pulses in the preliminary steps of obtaining a time difference reading, it may be desirable to provide a capacitor 95 that may be connected by a switch 96 to the coupling capacitor 66 so that by closing the switch 96 additional counts will be lost by the divider 33. Thus, the A and B pulses may be drifted toward the right by closing the switch 96. When the switch 96 is opened, the A and B pulses stop drifting and again are stationary.

CATHODE-RAY TRACE AND TIMING MARKER PRESENTATION

Before describing that portion of the receiving apparatus of Fig. 1 to which the timing marker and control pulses from the pulse generator unit are applied, reference will be made to Figure 11. In Fig. 11, the graphs K and I show the wave shapes of the slow-sweep and fast-sweep horizontal deflecting waves, respectively, for obtaining the desired cathode-ray traces. The starting time $t$ of the second saw-tooth wave $c$—$d$ of the slow-sweep wave K and of the second fast-sweep wave $h$—$i$ may be adjusted by adjusting a multivibrator 101 by a knob 102' (Fig. 1), and by adjusting a fine delay circuit 106 with knob 106', as will be explained hereinafter, for aligning the A and B pulses. Three switching positions identified as positions #1, #2 and #3 are used successively in aligning the A and B pulses. It will be understood that while the pulses A and B and their corresponding traces appear alternately on the cathode-ray tube screen, they appear to the eye to occur simultaneously because of persistence of vision, lag of phosphorescence of the screen or both.

As shown in Figs. 10 and 11, the B pulse is the one that occurs after the mid-point of the A pulse period, and it is the A pulse that is made to fall on the trace produced by the adjustable deflecting wave by adjusting its starting time, this wave being the slow-sweep wave $c$—$d$ during the initial pulse alignment and the fast-sweep wave $h$—$i$ during the final pulse alignment. By making the A pulse fall on the trace having the adjustable starting time, it is possible to provide an expanded trace with the expansion occurring where it is needed, i. e., where the 10 µs. markers are to be counted. This feature is claimed broadly in copending application Serial No. 560,648, now issued as Patent No. 2,430,570 on November 11, 1947 filed October 27, 1944 in the name of George D. Hulst, Jr., entitled Radio navigation system which describes a system wherein timing marks are counted on two simultaneously visible traces, one of which is expanded. In the present system, the timing mark counting is done by switching first to the slow-sweep trace to count 1000 µs. intervals by means of 1000 µs. pulses and then to the fast-sweep trace to count the fractional 1000 µs. interval by means of 100 µs. and 10 µs. pulses.

After the A and B pulses have been aligned with the receiver switched successively to operating positions #1, #2 and #3, the receiver is switched to a #4 operating position for obtaining the count of 1000 µs. intervals. In the #4 position, the right-hand portion of the second sawtooth wave $c$—$d$ is blanked out from the midpoint $d'$ of the deflecting wave cycle by a blanking wave L and the 1000 µs. timing markers are made to appear on the slow-sweep traces. The desired time interval is determined by counting the number of 1000 µs. marks on the upper trace $c$—$d'$ which is illustrated in Fig. 8 and at the lower left in Fig. 11. It will be apparent that the time interval thus obtained is the amount that the starting time $t$ of the wave $c$—$d$ has been advanced in time with respect to the mid-period $d'$ of the deflecting wave cycle in order to align the A and B pulses. The time interval has not yet been determined exactly, however, because the fractional 1000 µs. interval can be estimated only roughly on the slow-sweep scale.

To find the fractional 1000 µs. interval exactly, the fast sweep is next switched on by switching to a #5 operating position and the 10 µs., 100 µs. and 1000 µs. markers are made to appear on the resulting upper fast trace (illustrated in Fig. 9 and at lower left in Fig. 11) which is produced by the second fast-sweep wave $h$—$i$ of Fig. 11. The resulting lower fast trace (illustrated in Fig. 9 and at lower left in Fig. 11) is produced by the first fast-sweep wave $f$—$g$ of Fig. 11 and on this lower trace 50 µs. marker pulses are made to appear. The second of these 50 µs. marks (counting left to right) is used as a cross-hair marker.

The fractional 1000 μs. interval is found by counting the 100 μs. and 10 μs. marks on the upper trace and by estimating the number of microsecond units lying between the last counted 10 μs. marker on the upper fast trace and the 50 μs. cross-hair marker on the lower fast trace as explained more fully hereinafter.

Before describing the method of operation in more detail, the receiver system as illustrated in Fig. 1 will be further described.

DESCRIPTION OF CATHODE-RAY TRACE PRODUCING CIRCUITS, MIXING CIRCUITS, ETC. OF FIG. 1

Referring to Fig. 1 and to the graphs of Figs. 10 and 11, the Eccles-Jordan oscillator 65 is triggered by the 20,000 μs. pulses supplied over the conductor 61 to produce a rectangular voltage wave C. Timing pulses from the counters of the pulse generator unit are shown at the tops of the Figures 10 and 11.

The front or rising edges of the wave C trigger this multivibrator 101 to produce a rectangular wave similar to the wave F, the back edge of the narrow pulse portion of this wave being adjustable by means of the knob 102'. This timing of the back edge controls the starting time t of the second sweep portion c—d of the slow-sweep deflecting wave K as will soon be apparent. The multivibrator 101 may be any one of the several well known types such as, for example, the one described in British Patent 456,840 to White and in the A. I. E. E., vol. 60, 1941, pp. 371 to 376. To obtain a tighter lock-in of the multivibrator 101 with respect to the timing marker pulses, 500 μs. lock-in pulses from the counter 33 are supplied over a lead 100 to the multivibrator 101.

In order to obtain a more precise timing adjustment than can be made at the multivibrator 101, the wave F that is shown in Fig. 10 is obtained in Fig. 1 from an adjustable delay circuit 106 that integrates and clips the narrow pulse portion of the rectangular wave from the multivibrator 101 in a manner well known in the art to provide a fine timing adjustment of the back edge of the wave F. The fine timing adjustment is made by operating a knob 106' that, for example, changes the capacity of the integrating circuit. If preferred, the fine timing adjustment of the back edge of the wave F may be obtained by a second multivibrator that is substituted for the integrating-clipping circuit 106. Such a multivibrator would be similar to the multivibrator 101 but designed to provide a small timing change.

The rectangular wave C from the multivibrator 101 is also passed through a differentiating circuit 107 to produce the differentiated wave E which, after clipping in a mixer circuit 110, appears as the first and third pulses of the wave H in the illustration of Fig. 10. Likewise, the wave F from the delay circuit 106 is passed through a differentiating circuit 108 to produce the differentiated wave G which, after clipping in the mixer 110, appears as the second and fourth pulses of the wave H in the illustration of Fig. 10. The mixer circuit 110, as indicated above, functions both to clip off the negative pulses of waves E and G and to mix the remaining clipped positive pulses. Thus, the wave H is obtained at the mixer output, the mixer, which may consist of two vacuum tubes having a common anode resistor, having reversed the polarity of the pulses. It will be seen that the front edges of alternate pulses of the wave H coincide with the back edges of the wave F.

The wave H is supplied over a conductor 112 to the fast-sweep deflecting circuit 111 and a slow-sweep circuit 115 comprising, respectively, a vacuum tube 116 and a network 117, and a vacuum tube 118 and a network 119. The tubes 116 and 118 are coupled anode-to-grid through a capacitor 121 and a grid-leak resistor 122. The narrow negative pulses of wave H produce the fast-sweep waves f—g and h—i (in solid line in Fig. 10) of wave I having the same duration as the pulses of wave H. The slow-sweep waves a—b and c—d of wave K are initiated by the positive pulses of a wave J (Fig. 10) that is obtained by differentiating the wave H (reversed in polarity by the tube 116) by means of the coupling capacitor 121 and the grid-leak resistor 122. The deflecting waves I and K are applied from the circuits 111 and 115 through a wave selecting switch 123 and through a push-pull amplifier 124 and coupling capacitors 126 and 127 to the horizontal deflecting plates 128 of the cathode-ray indicator tube 129.

The switch 123 has five contact points and five corresponding switch positions, referred to as operating positions, which are identified, reading clockwise, as positions #1, #2, #3, #4 and #5. There are six other operation positions switches, described hereinafter, that likewise have these five switch positions and which are ganged with the switch 123.

Switch 123, when in operation positions #1 and #4, functions to apply the slow-sweep wave K to the horizontal deflecting plates 128 and, when in operation positions #2, #3 and #5, functions to apply the fast-sweep wave I to the deflecting plates 128.

THE FAST-SWEEP CIRCUIT

Referring more specifically to the deflecting circuit 111 for producing the fast-sweep wave I, as shown in Fig. 1b the network 117 of deflecting circuit 111 comprises two sections consisting of cathode resistors 131 and 132 shunted by capacitors 133 and 134, respectively, identified as network sections 117a and 117b. The network 117 further comprises a delay line section 117c comprising series resistor 136 and shunt capacitors 137 connected across the cathode resistor 131 and terminated in a resistor 138 and in the cathode resistor 132. The fast-sweep wave I is taken off the resistor 138 through an adjustable tap 139, the setting of which determines the amplitude or voltage level $e_1$ (Fig. 11) of the wave I.

In operation, the capacitors of the network sections 117a and 117b are charged through the anode resistor 141 and the tube 116 to a certain voltage level between successive pulses of the wave H to bring the tap 139 to the voltage $e_1$. Upon the occurrence of each negative pulse of the wave H, the tube 116 is driven to cut-off and the capacitors 133 and 134 discharge through the resistors 131 and 132, respectively. The section 117a comprising capacitor 133 and resistor 131 has a fast time constant whereby the discharge of capacitor 133 produces a voltage of steep slope across resistor 131. The section 117b comprising capacitor 134 and resistor 132 has a slower time constant whereby the discharge of capacitor 134 produces a voltage of less slope across resistor 132. These two voltages of different slopes appear at the tap 139 as the sum of the two voltages with the voltage of the steeper slope slightly delayed by the delay network section 117c. One reason for providing this slight delay of a few microseconds (50 μs. in the example shown) is to make the 50 μs. cross-hair mark fall at a suitable point on the expanded portion of the fast-sweep. The wave form of the wave I following the 50 μs. delay is approximately logarithmic.

It should be understood that the fast-sweep wave I need not be of the wave form described and, in fact, may be linear although some form of increased expansion at the left end of the fast-sweep trace must be provided for the accuracy desired in the present embodiment of the invention. Such expansion may be obtained by employing either a logarithmic wave shape or an exponential wave shape, for example.

The above-described fast-sweep deflecting circuit is described and claimed in application Serial No. 583,255, filed March 17, 1945, in the name of George D. Hulst, Jr., and entitled Cathode ray deflection circuit.

THE SLOW-SWEEP CIRCUIT

Referring more specifically to the slow-sweep deflecting circuit 115, the network 119 consists of a cathode resistor 142 that has an adjustable tap 144 thereon and which is shunted by a capacitor 143. The operation is as follows: Each time one of the positive short pulses of the wave J appears on the grid of the tube 118, the capacitor 143 is charged suddenly from the anode voltage supply through the tube 118 to a certain voltage level to bring the tap 144 to the voltage level $e_1$ (Fig. 11). At the end of the positive pulse, the capacitor 143 discharges slowly through the resistor 141 thus producing either the slow-sweep sawtooth wave $a$—$b$ or the sawtooth wave $c$—$d$ at the tap 144. It will be noted that the duration and amplitude of each of the sawtooth components $a$—$b$ and $c$—$d$ of the wave K depend upon the interval between successive positive pulses of the wave J.

As previously noted, the starting time $t$ of the second slow-sweep wave $c$—$d$ is determined by the adjustment of the back-edge of the wave F whereby the start of the wave $c$—$d$ may be made to precede the received A pulse by the same amount that the start of the wave $a$—$b$ precedes the received B pulse, this being the condition of alignment of the A and B pulses. It should also be noted that the wave $a$—$b$ is identical with the corresponding portion of wave $c$—$d$ whereby exact alignment of the A and B pulses on the cathode-ray traces is obtained (as shown in Fig. 4) when the above-described timing relation exists. The remarks of this paragraph apply also to the fast-sweep waves $f$—$g$ and $h$—$i$ of the wave I, the condition of final alignment on the fast-sweep traces (with the traces collapsed or superimposed) being illustrated in Fig. 7.

HORIZONTAL DEFLECTING AMPLIFIER

The push-pull amplifier 124, through which the deflecting waves I and K are selectively applied to the horizontal deflecting plates 128, comprises an amplifier tube 146 having a cathode biasing resistor 147. The anode of the tube 146 is coupled to the grid of a phase inverter tube 151 through a coupling capacitor 148 and through a voltage divider comprising resistors 149 and 153. A capacitor 152 of 5 mmf. is connected across the series resistor 149 to compensate for the grid-cathode capacity of the tube 151. The tube 151 is provided with a cathode biasing resistor 154.

A bleeder resistor 156 is connected from the anode of the tube 146 to the arm of a bias control switch 157. The #1 and #4 contact points of the bias switch 157 are connected to the cathode end of the cathode resistor 147 whereby, when the switch arm is on either the #1 or #4 contact points (the slow-sweep positions), an additional negative bias is applied to the grid of the tube 146.

The anodes of the amplifier tubes 146 and 151 are connected through coupling capacitors 158 and 159, respectively, to the horizontal deflecting plates 128.

THE RADIO RECEIVER

The A and B pulses from a pair of ground stations are received by a radio receiver of the superheterodyne type comprising a first detector and oscillator indicated at 161, an I.-F. amplifier 162, a second detector 163, and a video frequency amplifier 164. The A and B pulses are supplied with negative polarity over a conductor 166 and through a resistor 167 to the lower vertical deflecting plate 168. Thus, the A and B pulses may be made to appear, as shown in Figs. 2 to 7, on the horizontal cathode-ray traces. The A and B pulses are made to appear with equal amplitude on the cathode-ray tube screen by employing a differential gain control circuit described hereinafter.

SLOW-SWEEP TRACE SEPARATION

The slow-sweep traces $a$—$b$ and $c$—$d$ are separated as illustrated in Figs. 2 to 4 and in Fig. 8 while the receiver is on the #1 and #4 operation positions by means of a rectangular wave M (Fig. 10) supplied from the delay circuit 106 (Fig. 1) over a conductor 169 to the #1 contact point of a timing marker and trace separation switch 171, and over a conductor 169 and through a resistor 172 to the #4 contact point of said switch. When the switch arm of the switch 171 is in either position #1 or position #4 (the slow-sweep positions), the wave M is applied through a conductor 173, a reversing tube 170 and a coupling or blocking capacitor 174 to the upper vertical deflecting plate 168. Thus, the portion of the wave M, which is negative as it appears on the upper plate 168, holds the cathode ray deflected down a certain amount during the occurrence of the slow-sweep deflecting wave $a$—$b$.

FAST-SWEEP TRACE SEPARATION

The fast-sweep traces $f$—$g$ and $h$—$i$ are separated as illustrated in Figs. 5 and 6 and in Fig. 9 during the #2 and #5 operation positions (fast-sweep positions) by means of a rectangular wave D. This is obtained by passing a wave L (Fig. 10) from the E.-J. oscillator 65 over a conductor 176 to a delay circuit 177. The delayed wave at the output of the delay circuit 177 is the wave D' (Fig. 10) which is supplied to a push-pull amplifier 181 to obtain the wave D' and the wave D of opposite polarity at the leads 182 and 183, respectively. The waves D and D', which are identical except for polarity, are utilized for on and off keying of a pair of timing marker mixer tubes 178 and 179 (at upper right Fig. 1) and for operation of a differential gain control circuit (at lower left Fig. 1). These uses of waves D and D' will be described hereinafter. The wave D is also utilized for cross-hair trace separation. The wave D on the lead 183 is supplied over the lead 183 and a conductor 184 to the #2 contact point of the switch 171. The wave D is also supplied from the lead 183 to the #5 contact point of the switch 171 by way of a conductor 186 and a potentiometer resistor 187 having a variable tap 188 thereon, and through a resistor 189 and a conductor 191 to the #5 contact point. In operation position #5, the amount of trace separation may be adjusted by means of the tap 188 to bring the cross-hair mark, shown in Fig. 9, in proper relation to the trace $h$—$i$ on which the timing marks appear as will be described hereinafter.

From the foregoing it will be seen that suitable trace separation voltages are supplied to the upper deflecting plate 168 of the tube 129 by way of the switch 171 and the polarity reversing tube 170 for all switch positions except operation posion #3 where it is desired that the two traces be superimposed as shown in Fig. 7.

APPLICATION OF TIMING PULSES TO CATHODE-RAY TUBE

As shown in Figs. 8 and 9, certain timing pulses are made to appear on the traces of the cathode-ray tube 129 when the ganged switches are on the #4 and #5 operation positions, respectively, these two positions being the ones for reading the full 1000 $\mu$s. intervals and for reading the remaining fractional 1000 $\mu$s. interval, respectively. When the receiver is on either the #4 or the #5 position, the received pulses A and B do not appear on the cathode ray traces because a bias source 252 then supplies a negative voltage over a lead 249 to block the I.-F. amplifier 162. When the receiver is on the A and B pulse alignment positions, i. e., positions #1, #2 and #3, the only timing marks that appear on the traces are 10 $\mu$s. marks and 50 $\mu$s. marks in the "down" direction (not shown on the traces in Figs. 2 to 7).

The 10 $\mu$s. timing marks in the "down" direction are produced by 10 $\mu$s. pulses applied from the delay network 13 (at top of Fig. 1) over the conductor 81 and through a reversing tube 80 and the resistor 167 to the lower vertical deflecting plate 168 where they appear with positive polarity to produce "down" marks on the cathode-ray traces. The 50 $\mu$s. timing marks in the "down" direction are produced by 50 $\mu$s. pulses which are also applied to the lower deflecting plate 168, these being obtained from the 50 $\mu$s. counter 15. The pulses from counter 15 are supplied over a conductor 192 and through a reversing tube 190 and a resistor 193 to the deflecting plate 168 where they appear with positive polarity to produce "down" marks on the cathode-ray traces. The delay network 13 is provided so that the 10 $\mu$s. pulses on the deflecting plate 168 will occur substantially with the 1000 $\mu$s. pulses, the latter having been delayed slightly by delay occurring in the frequency divider chain.

Reference will now be made to the circuit for feeding timing pulses through the timing marker and trace separation switch 171 to the upper vertical deflecting plate 168.

100 $\mu$s., 500 $\mu$s., and 1000 $\mu$s. marker pulses are applied to the grid of the mixer tube 178 from a conductor 194, the 100 $\mu$s. and 1000 $\mu$s. pulses being applied with positive polarity and the 500 $\mu$s. pulses being applied with negative polarity. The counters 16, 33 and 52 supply these pulses to the conductor 194 by way of the conductor 87, a capacitor 196 and a lead 197, respectively.

50 $\mu$s. marker pulses are applied with positive polarity to the grid of the mixer tube 179 from a conductor 198 carrying timing marker pulses from the counter 15, the marker pulses being applied to the grid through a resistor 199 and a capacitor 201. Also, 500 $\mu$s. marker pulses of positive polarity (these being the second kick of a blocking oscillator cycle) are applied to the grid of the tube 179 from a conductor 180 carrying timing marker pulses from the counter 33.

The mixer tubes 178 and 179 are blocked alternately by the waves D and D' of opposite polarities which are supplied from the conductors 183 and 182, respectively, to the grids of the tubes 178 and 179. The wave D' is applied to the tube 178 through a capacitor 202 and a resistor 203, while the wave D is applied to the tube 179 through a capacitor 204 and a resistor 206.

From the foregoing, it will be seen that when the receiver is on the #5 position, the tube 178 passes 100 $\mu$s., 500 $\mu$s. and 1000 $\mu$s. marker pulses to the upper deflecting plate 168 of the cathode-ray tube 129 during the occurrence of the fast-sweep wave $h$—$i$ and while the tube 179 is blocked, and that the tube 179 passes the 500 $\mu$s. marker pulses and the 50 $\mu$s. marker pulses (one of which provides a cross-hair mark) to the said deflecting plate during the occurrence of the fast-sweep wave $f$—$g$ and while the tube 178 is blocked. All these pulses, except the 500 $\mu$s. pulses passed by the tube 178, appear on the upper plate 168 to make marks that are "up" on the cathode-ray traces. The 500 $\mu$s. pulses reduce the amplitude of every fifth 100 $\mu$s. mark thereby facilitating the counting of the 100 $\mu$s. marks. The resulting marker presentation is that illustrated in Fig. 9. The method of counting the timing marks will be described hereinafter.

The mixer tubes 178 and 179 have a common anode resistor 207 and their timing pulse outputs are supplied to the lead 191 through a coupling capacitor 208. The tube 178 is provided with a grid leak resistor 209 and a cathode biasing resistor 121 that is shunted by a capacitor 212. The tube 179 is provided with a grid leak resistor 213 and a cathode resistor 214 that is shunted by a capacitor 216.

In the #4 operation position, 1000 $\mu$s. pulses of negative polarity from the 1000 $\mu$s. pulse counter 52 are applied to the #4 contact point of the switch 171 by way of a conductor 217 through a resistor 218 and a capacitor 219. These pulses appear on the upper plate 168 with positive polarity to produce marks that are "up" on the cathode-ray traces.

SLOW SWEEP BLANKING

A right-hand portion $d'$—$d$ of the slow-sweep trace $c$—$d$ is blanked out when the receiver is on the #4 operation position for reading the 1000 $\mu$s. intervals (Fig. 8). This reading is obtained by counting all the 1000 $\mu$s. marks appearing on the upper trace $c$—$d'$, the marks on the lower trace $a$—$b$ being ignored. The trace $a$—$b$ could be blanked out when taking this reading but this is not done in the embodiment illustrated. As indicated in Figs. 10 and 11, the above-mentioned blanking of the trace $c$—$d$ is done by the wave L which has the same timing as the wave C from the E.-J. oscillator 65, and which, therefore, has a negative half cycle starting at the mid-point $d'$ of the 40,000 $\mu$s. deflecting wave cycle. This mid-point is, of course, 20,000 $\mu$s. from the start of the deflecting wave cycle. It is apparent that if the slow-sweep trace $c$—$d$ is blanked out from said 20,000 $\mu$s. midpoint $d'$ to the end $d$ of the trace, the amount that the starting time $t$ of the wave $c$—$d$ has been shifted to the left (i. e., advanced in time) with respect to said mid-point can be found to a fractional 1000 $\mu s$. interval by counting the 1000 $\mu s$. timing marks on the remaining left-hand portion $c$—$d'$ of the trace. This is done with the receiver on the #4 operation position, the cathode-ray traces and timing marks appearing on the cathode-ray tube screen as shown in Fig. 8.

Referring now to the blanking circuit shown in Fig. 1 for blanking the trace $c$—$d$ as described above, the wave L is supplied from the E.-J. oscillator 65 over the conductor 76 to the #4 contact point of a blanking switch 221. From contact point #4 the wave L is supplied through a conductor 222 and a coupling capacitor 223 to the anode of a diode 224, and over a conductor 226 to the control grid 227 of the cathode-ray tube 129. Thus, the wave L drives the cathode-ray tube 129 substantially to electron beam cut-off during negative half cycle of the wave whereby only the trace portion $c$—$d'$ of the upper trace appears on the fluorescent screen as shown in Fig. 8.

Blanking at the end of each fast sweep is provided when in the #2, #3 and #5 operation position by means of the negative portions of the wave H as it appears on the anode of the tube 116, it being noted that the tube 116 reverses the polarity of the wave H applied to its grid. The wave H is supplied from the anode of tube 116 to the #2, #3 and #5 contact point of the switch 221 whereby, in the #2, #3 and #5 operation position, this wave is supplied over conductors 222 and 226 to the grid 227 of the cathode-ray tube.

TRACE BRILLIANCE CONTROL

The diode 224 is provided to control the brilliance of the timing marks and traces on the cathode-ray tube screen by preventing changes in bias on the cathode-ray tube grid 227 due to the application of blanking pulses. A leak resistor 228 is connected across the diode 224 and the cathode of the diode 224 is connected to a variable tap 228 on a bias voltage source comprising a voltage divider resistor 229.

In operation, during the periods that the blanking waves are positive at the anode of the diode 224, the impedance of the diode 224 is very low so that its anode is practically at the potential of the bias or brilliance control tap 228. Thus, regardless of the form of the blanking wave and regardless of whether any blanking wave is being applied, the voltage on the grid 227 of the cathode-ray tube during the cathode-ray sweeps is substantially the voltage on the tap 228.

HORIZONTAL CENTERING CIRCUITS

Since different centering voltages should be applied to the horizontal deflecting plates 128 during the slow-sweep deflection than during the fast-sweep deflection, these plates are connected through resistors 231 and 232 to the arms of two five-position switches 233 and 234, respectively. The #1 and #4 contact points of the switches 234 and 233 are connected to variable taps on voltage divider resistors 236 and 237, respectively, the said taps being adjustable by means of a centering knob 238.

Likewise, the #2, #3 and #5 contact points of the switches 234 and 233 are connected to variable taps on voltage divider resistors 239 and 241, respectively, the said taps being adjustable by means of a centering knob 242. Thus, the centering voltages are changed when the several ganged five-position switches are changed from a slow-sweep position to a fast-sweep position or vice versa.

DIFFERENTIAL GAIN CONTROL CIRCUIT

A differential gain control circuit for the I.-F. amplifier 162 of the radio receiver preferably is provided as indicated in Fig. 1 for the purpose of keeping the amplitudes of the A and B pulses substantially alike at the receiver output, thus facilitating the A and B pulse alignment. The gain control circuit includes a potentiometer resistor 243 in the output circuit of the push-pull amplifier 181. The delayed waves D and D' are applied to the opposite ends of the resistor 243. An adjustable differential gain balance tap on resistor 243 may be moved to either side of the center thereof to decrease the gain of the I.-F. amplifier 162 during either the reception of the pulse A or the pulse B. The voltage at the gain balance tap is supplied through a resistor 244 and a capacitor 246 to the anode of a diode 247 and to the #2 and #3 contact points of a differential gain control switch 248. Thus when the receiver is on either the #2 or #3 operation position for pulse alignment on the fast sweeps, the differential gain control voltage is applied through the switch 248 and a conductor 249 to the gain control grid of an amplifier tube in the I.-F. amplifier 162.

The differential gain control operation with the receiver on either #2 or #3 operation position is as follows:

When the gain balance tap is at the center of resistor 243, the waves D and D' balance or cancel each other at the tap and no voltage wave is applied to the diode 247. When the tap is on the upper side of this balance position, a wave of one polarity, that of wave D', is applied to the diode 247; when the tap is on the lower side of the balance point, a wave of the opposite polarity, that of wave D, is applied to the diode 247. The diode 247 functions to supply a negative bias during the negative half cycle following a positive cycle of an applied wave. For example, if the applied wave corresponds to wave D', the positive half cycle causes diode current to charge capacitor 246, and during the following negative half cycle the capacitor 246 discharges slowly through a resistor 251 connected across the diode 247 thus making the anode of diode 247 negative with respect to ground and reducing the gain of the I.-F. amplifier 162 while the B pulse is being amplified.

It will be apparent that by delaying the waves D and D' there is avoided the possibility of transient voltages causing a disturbance in the I.-F. amplifier 162 during the amplification of the pulse "A" or the pulse "B," such transient voltages being produced when the waves D and D' change from positive to negative polarity or vice versa. Likewise, switching disturbances in the mixer tubes 178 and 179 during the fast sweeps $f$—$g$ and $h$—$i$ are avoided.

With switch 248 on the #1 operation position for pulse alignment, normal operating bias is on the I.-F. amplifier 162. With the switch 248 on either the #4 or the #5 operation position for time marker reading, a battery 252 applies a blocking bias through the lead 249 to the I.-F. amplifier 162 whereby the A and B pulses are not applied to the cathode-ray tube 129.

A AND B PULSE DRIFT CONTROL

The apparatus illustrated in Fig. 1 includes three control elements for causing the received A and B pulses to drift to the right or to the left

17 on the cathode-ray traces during the pulse alignment procedure. Two of these have already been described, one of them being the right-drift switch 96 associated with the station selector switch to give fast drift to the right, and the other being the control knob 11 of the oscillator 10 which may be adjusted to give a slow drift either to the right or to the left.

The third drift control element is a left-drift switch 253 for providing a fast drift to the left. This left drift of the A and B pulses is obtained by supplying the wave H from the mixer 110 over a conductor 254 and through a resistor 256 and a capacitor 257 to a contact point of the switch 253. The wave H is then applied to the blocking oscillator 12 when the switch 253 is in the left-drift position. The negative polarity portions of the wave H block the oscillator 12 while they are on the grid of the oscillator, thus allowing the blocking oscillator 15 to run unkeyed for a fraction of the time, and thereby increasing average repetition period to produce the desired drift.

PROCEDURE IN MAKING A TIME MEASUREMENT

The successive steps in making a measurement of the time interval between the A and B pulses from a pair of ground stations will now be described.

ALIGNMENT OF A AND B PULSES

Position #1

After a particular pair of ground stations has been selected with the receiver set on the #1 operation position, the A and B pulses will appear stationary on the two traces, which at this time are of equal length. The pulses A and B appear on the traces in some such relation as shown in Fig. 2. At this point it is not known which one of the pulses is on a particular trace. To determine this, a drift switch is operated to drift both pulses onto the trace $a$—$b$ with one pulse on the left end of the trace. The first occurring pulse, i. e., the left one is the B pulse. That this is true will be evident by referring to Fig. 10 and by assuming that the starting time $t$ of the slow-sweep wave $c$—$d$ is at the mid-point of the deflecting wave cycle, the condition for equal length traces.

Next the starting time $t$ of the sweep wave $c$—$d$ (Fig. 10) is advanced by operating the controls 102' and 106' of the variable delay circuits 101 and 106 (Fig. 1) to make the A pulse fall on the upper trace $c$—$d$ and also to make it align approximately, at least, with the B pulse as shown in Fig. 4.

Position #2

Next the receiver is switched to the fast-sweep operation position #2 which results in the A and B pulses appearing as shown in Fig. 5, for example. It is apparent now that the pulses are not exactly aligned. By operating drift switch 253 and/or knob 11 the A and B pulses are drifted to the left where they are on a more expanded portion of the fast sweeps and may be further aligned as shown in Fig. 6.

Position #3

The final alignment of the A and B pulses is done on operation position #3 with the two traces superimposed as shown in Fig. 7. The front edges of the A and B pulses are exactly aligned (they usually differ slightly in shape) by operating the knob 106' of the fine timing adjustment circuit 106 (Fig. 1). The time reading can now be made.

18

THE TIME DIFFERENCE READINGS

Position #4

Having aligned the A and B pulses, the receiver is switched to the #4 slow-sweep operation position whereby the 1000 $\mu$s. timing marks appear on the cathode-ray tube screen (in the "up" direction from the traces) as shown in Fig. 8 while 50 $\mu$s. and 10$\mu$s. marks may appear on the screen (in the "down" direction) they are too closely spaced to be counted. The marks on the lower trace $a$—$b$ are ignored. The full 1000 $\mu$s. intervals are found by counting all the 1000 $\mu$s. timing spaces on the upper trace $c$—$d'$ (this being the unblanked portion of the trace $c$—$d$). Fig. 11 shows the relationship of the deflecting wave $c$—$d$, the blanking wave L and the 1000 $\mu$s. timing marks, and by graphical construction shows the resulting trace $c$—$d'$ and the timing marks thereon.

Figs. 8 and 11 do not illustrate the same time reading; the reading in Fig. 8 being seven 1000 $\mu$s. spaces or 7000 microseconds plus a fractional interval, and the reading in Fig. 11 being four 1000 $\mu$s. spaces or 4000 microseconds plus a fractional interval. Note is made of the fact that the 1000 $\mu$s. mark coinciding with the right-hand end $d'$ of the trace is not counted (as there is one more mark than integral spaces) and therefore it may be blanked out, if desired.

Position #5

For the final time reading the receiver is switched to the #5 fast-sweep operation position whereby the 1000 $\mu$s. and 100 $\mu$s. timing marks appear in the "up" direction on the upper trace $h$—$i$ and whereby the 500 $\mu$s. marks and the 50 $\mu$s. marks (one of the 50 $\mu$s. marks being the cross-hair mark) appear also in the "up" direction on the lower trace $f$—$g$ as shown in Fig. 9. Due to the 50 $\mu$s. and 10 $\mu$s. pulses applied to the lower plate 168, 50 $\mu$s and 10 $\mu$s. marks appear in the "down" direction on both traces. The 100 $\mu$s. and 10 $\mu$s. intervals are obtained by counting (right to left) from and including the first 1000 $\mu$s. marker appearing to the right of the cross-hair mark. The cross-hair mark is the second 50 $\mu$s. mark from the left on the lower trace $f$—$g$. The reason for including the 1000 $\mu$s. marker in the count is explained hereinafter. Only one 1000 $\mu$s. marker appears in the example shown in Fig. 9 but two of them may appear.

The reading in the example of Fig. 9 for 100 $\mu$s. intervals is 2, and for 10 $\mu$s. intervals (counting from the first 100 $\mu$s. mark to the right of the cross-hair) is 6. The number of microseconds in units between the last 10 $\mu$s. mark and the cross-hair is estimated at 5 $\mu$s. Thus, the reading in position #5 for the example of Fig. 9 is 265 $\mu$s.

The complete reading for the example illustrated in Figs. 8 and 9 is 7265 $\mu$s.

At first glance it would appear that, in counting the 100 $\mu$s. intervals, the first mark to be counted should be the first 100 $\mu$s. marker to the left of the 1000 $\mu$s. mark from which the count starts. The reason for including the said 1000 $\mu$s. mark in the count is that this adds a 100 $\mu$s. interval at the start of the count to make up for the loss of a 100 $\mu$s. interval at the end of the count. The loss of an interval is due to the fact that the 50 $\mu$s. mark which is utilized as the cross-hair is 100 $\mu$s. from the start of the trace $f$—$g$. This will be better understood by referring to Fig. 11.

Fig. 11 shows the relationship of the fast-sweep deflecting waves *f—g* and *h—i* and the timing marker pulses (the 10 μs. pulses being omitted), and by graphical construction shows the resulting traces *h—i* and *f—g* and the timing and cross-hair marks thereon.

The first feature to be noted in Fig. 11 is that the fast-sweep wave *h—i* occurs during the fractional 1000 μs. interval of the count that was made with the receiver in the #4 operation position. This fractional interval could be found accurately merely by counting 100 μs. and 10 μs. timing marks on the resulting trace *h—i* (i. e., counting from the 1000 μs. mark at the start of said interval over to the left end of the trace *h—i*) if the wave *h—i* (also the wave *f—g*) started at the time *t* with sufficient expansion and also gave a well defined trace at the start. A more desirable procedure is to generate the wave *h—i* and *f—g* as described and count the timing marks on the upper trace *h—i* over to a cross-hair mark on the lower trace *f—g*, this being the second 50 μs. mark from the left end of said trace. Thus, any necessity for reading marks on the first 100 μs. portion of the fast-sweep traces is avoided. As previously stated, the 100 μs. interval lost by counting to the cross-hair mark instead of to the end of the trace is added at the start of the count by counting the 1000 μs. mark as a 100 μs. interval.

The fractional interval count illustrated in Fig. 11 is 445 μs. The complete count illustrated in this figure, therefore, is 4445 μs.

CHECKING OF COUNTER OPERATION

The reason for applying 500 μs. pulses from the lead 180 to the mixer tube 179 is to produce a 500 μs. mark on the lower fast-sweep trace *f—g* so that the operator may determine whether the counter feed-back circuits for station selection are operating properly. As previously explained, at 0 station position no time intervals are subtracted; at #1 station position, a 50 μs. interval is substracted; at #2 station position, a 100 μs. interval is subtracted, etc. These intervals are subtracted at the beginning of both the upper sweep trace and the lower sweep trace and vary from a total of 50 μs. on #1 station position to 350 μs. on #7 station position.

To make a check on the feed-back operation, the 50 μs. pulses on the lower trace *f—g* are counted from the cross-hair mark to the first 500 μs. mark (counting left to right). On the 0 station position, between these two marks there should be eight 50 μs. intervals or seven 50 μs. marks, the eight 50 μs. mark coinciding with the 500 μs. mark. On the #1 station position there should be six 50 μs. marks, on the #2 station position five 50 μs. marks, etc. If when the station selection switch is on the #2 position, for example, a check shows a number of 50 μs. marks other than five, then the operator knows that he must adjust the feed-back circuit to avoid selecting the wrong pair of ground stations.

We claim:

1. In a radio navigation system wherein a pair of periodically recurring radio pulses transmitted from a pair of spaced synchronized radio ground stations are received to determine the time difference of said pair of pulses at the point of reception and thereby locate a position line for the point of reception, means including a cathode ray tube and a comparatively slow-sweep deflection circuit for determining or indicating said time difference in terms of time intervals of a certain duration within a fractional part of one of said time intervals, means including a comparatively fast sweep deflection circuit for deflecting the cathode ray of said cathode-ray tube during said fractional part of a time interval and for determining or indicating said fractional part of a time interval in terms of smaller time intervals, and means for selectively switching either of said time determining means to an operating condition.

2. The invention according to claim 1 wherein said fast-sweep deflection circuit is designed to produce a deflecting wave that deflects said cathode ray first rapidly and then comparatively slowly to produce a trace that is expanded at its start.

3. In a radio navigation system wherein a pair of periodically recurring radio pulses A and B transmitted from a pair of spaced synchronized radio ground stations, respectively, are received to determine the time difference of said pair of pulses at the point of reception and thereby locate a position line for said point of reception, and wherein said A pulse precedes the mid-point of the B pulse period by a predetermined amount at the points of transmission, means including a cathode ray tube and a comparatively slow-sweep deflection circuit for determining or indicating the number of whole time intervals of a certain duration in the time period between said mid-point of the B pulse period and the A pulse, there being a fractional part of one of said time intervals at the beginning of said time period that is yet to be determined in terms of smaller time intervals, means including a comparatively fast-sweep deflection circuit for deflecting the cathode ray of said cathode ray tube during said fractional part of a time interval for determining or indicating said fractional part of a time interval in terms of smaller time intervals, and means for selectively switching either of said time determining means to an operating condition.

4. In a radio navigation system wherein a pair of periodically recurring radio pulses A and B transmitted from a pair of spaced synchronized radio ground stations, respectively, are received to determine the time difference of said pair of pulses at the point of reception and thereby locate a position line for said point of reception, and wherein said A pulse precedes the mid-point of the B pulse period by a predetermined amount at the points of transmission, means including a cathode ray tube and a comparatively slow-sweep deflection circuit for determining or indicating the number of whole time intervals of a certain duration in the time period between said mid-point of the B pulse period and the A pulse, there being a fractional part of one of said time intervals at the beginning of said time period that is yet to be determined in terms of smaller time intervals, means including a comparatively fast-sweep deflection circuit for deflecting the cathode ray of said cathode ray tube during said fractional part of a time interval for determining or indicating said fractional part of a time interval in terms of smaller time intervals, said fast-sweep circuit being designed to produce an expanded trace by deflecting the cathode ray of said tube first rapidly and then more slowly, and means for selectively switching either of said time determining means to an operating condition.

5. In a radio navigation system wherein a pair of periodically recurring radio pulses A and B transmitted from a pair of spaced synchronized radio ground stations, respectively, are received to determine the time difference of said pair of pulses and thereby locate a position line for the point of reception, said A pulse preceding the mid-point of the B pulse period by a predetermined amount at the points of transmission, means including a cathode ray tube and a comparatively slow-sweep deflection circuit for producing pairs of slow-sweep traces having the same repetition rate as said B pulses, means for making a pair of A and B pulses appear on at least one of said traces, means including a timing pulse generator connected to produce timing marks spaced by time intervals of like duration on at least one of said traces for indicating the number of whole time intervals of said duration in the time period between said mid-point of the B pulse period and the A pulse, there being a fractional part of one of said time intervals at the beginning of said time period that is indicated only approximately, means including a comparatively fast-sweep deflection circuit for deflecting the cathode ray of said tube successively for producing pairs of fast-sweep traces having the same repetition rate as said B pulses and with the fast-sweep deflection that produces one of said fast-sweep traces occurring during said fractional part of a time interval, means for making a pair of A and B pulses appear on the two traces, respectively, of said pair of fast-sweep traces, means including said timing pulse generator for putting timing marks which are spaced by smaller time intervals than said first-mentioned time interval on said fast-sweep traces whereby said fractional part of a time interval may be determined from the smaller time-interval marks produced by the timing pulses occurring during said fractional part of a time interval, and means for selectively switching either of said time determining means to an operating condition.

6. The invention according to claim 5 wherein said fast-sweep deflection circuit is designed to produce a deflecting wave that deflects said cathode ray first rapidly and then comparatively slowly to produce a trace that is expanded at its start.

7. The method of measuring the time relation of one group of periodically recurring received pulses with respect to another group of periodically recurring received pulses where both groups of received pulses have the same repetition period and where said groups are produced by transmitting periodically recurring pulses A and B from a pair of spaced synchronized radio ground stations, respectively, said A pulse preceding the mid-point of the B pulse period by a predetermined amount at the points of transmission, said method comprising the steps of producing two successive slow-sweep cathode-ray deflecting waves, said pair of deflecting waves having a total repetition period equal to that of said groups of received pulses, producing groups of timing pulses each group having a different repetition period and having a fixed time relation to the start and finish of the cycle of said two deflecting waves, causing each of said deflecting waves to produce a slow cathode-ray trace upon at least one of which a group of said timing pulses may be made to appear, also producing two successive fast-sweep cathode ray deflecting waves each starting from the same voltage level and each of identical slope and having a total repetition period equal to that of said groups of received pulses, causing each of said fast-sweep deflecting waves to produce a cathode-ray trace and causing a received pulse of each group of received pulses to appear on said two fast-sweep cathode-ray traces, respectively, advancing the start of the second fast-sweep deflecting wave of said cycle with respect to the mid-point in the full deflecting wave cycle until said received pulses on said fast-sweep traces are in exact alignment or coincidence, cause the timing marks having one of the longer repetition periods to appear on at least one of said slow-sweep traces and counting said last-mentioned timing marks from a point corresponding to the mid-point of said deflecting wave cycle to that one of said last-mentioned marks which occurs immediately following an A pulse to determine within a certain fractional time interval of said longest repetition period the amount of time that the start of said second fast deflecting wave is advanced with respect to said mid-point, causing the pulse corresponding to said last-counted timing mark immediately following the A pulse and also at least one group of pulses having a shorter repetition period than said longer repetition period to appear as timing marks on the fast-sweep trace produced by said second fast-sweep deflecting wave, causing a timing pulse from one of said groups having one of the shorter repetition periods to appear as a cross-hair mark on the first part of the trace produced by the first fast-sweep deflecting wave, and counting timing marks on the trace produced by said second fast-sweep wave from the mark produced thereon by the pulse corresponding to said last-counted timing mark to said cross-hair mark on said first fast-sweep trace to determine said fractional time interval.

8. In a navigation system wherein periodically recurring radio pulses are radiated from A and B ground stations as A and B pulses, respectively, with the B pulses occurring at a predetermined time following the mid-point of the period of the A pulses, the method of measuring the time interval between the A and B pulses as they appear at a point remote from said ground stations which comprises receiving said A and B pulses at said point, producing pairs of periodically recurring pulses, the second pulse of the pair being adjustable in time with respect to the first pulse of the pair, successively producing pairs of sequentially occurring slow-sweep deflecting waves, at least the first wave of the pair occurring in a fixed time relation to the first of said pair of pulses, deflecting a cathode ray successively by said waves to produce two parallel adjacent cathode-ray traces, causing said A and B pulses to appear on said traces, establishing a certain time relation between the B pulse and a time reference point, adjusting the timing of said adjustable pulse to establish the same time relation between the A pulse and said adjustable pulse as said previously established time relation between the B pulse and its time reference point, successively producing pairs of sequentially occurring fast-sweep deflecting waves having decreasing slope from at least near the start of the wave and which are identical throughout their useful deflecting portions, the first wave in each pair of fast-sweep waves starting at the same time as the first wave in each pair of slow-sweep waves, the start of the second fast-sweep wave being initiated by said adjustable pulse, deflecting said cathode ray successively by said fast-sweep waves to produce two parallel adjacent cathode-ray traces whereby said A and B pulses appear on said two fast-sweep traces with the A pulse on the trace that is produced by the second of said pair of fast-sweep waves, and producing timing marks on a trace produced by one of said slow-sweep deflecting waves and on the traces produced by said fast-sweep deflecting waves whereby the time difference between a time reference point and the starting time of said adjustable pulse may be determined.

9. In a navigation system wherein periodically recurring radio pulses are radiated from A and B ground stations as A and B pulses, respectively, with the B pulses occurring at a predetermined time following the mid-point of the period of the A pulses, a receiver for receiving said A and B pulses, a cathode-ray deflecting circuit for producing successively pairs of sequentially occurring slow-sweep deflecting waves, a second cathode-ray deflecting circuit for producing successively pairs of sequentially occurring identical fast-sweep deflecting waves having decreasing slope from at least near the start of the wave, means for deflecting a cathode ray by said slow-sweep waves to produce two parallel adjacent slow-sweep cathode-ray traces and for deflecting it by said fast-sweep waves to produce two parallel adjacent fast-sweep cathode-ray traces which are expanded at one end, means for adjusting the starting time of the second of said pair of fast-sweep deflecting waves, means for causing said A and B pulses to appear on said two fast-sweep traces with the A pulse on the trace that is produced by said second fast-sweep deflecting wave whereby said A and B pulses may be aligned by adjusting said starting time, and means comprising a chain of frequency dividers for producing timing pulses including groups of 1000 $\mu$s., 100 $\mu$s. and 10 $\mu$s. timing pulses, and means for causing said 1000 $\mu$s. timing pulses to produce timing marks on at least one of said slow-sweep traces whereby said 1000 $\mu$s. marks may be counted to determine the time relation of said A and B pulses to a fractional 1000 $\mu$s. interval, means for causing the 1000 $\mu$s. timing pulse that is adjacent to said fractional interval, and also the 100 $\mu$s. timing pulses and the 10 $\mu$s. timing pulses to produce timing marks on the fast-sweep trace which is produced by the second fast-sweep deflecting wave, and means for causing a timing pulse to produce a timing mark on the expanded end of the other fast-sweep trace and extending toward the trace produced by said second fast-sweep wave whereby it may be utilized as a fixed position cross-hair mark in counting timing marks appearing on the fast-sweep adjustable trace.

10. The invention according to claim 9 wherein means is also provided for producing 500 $\mu$s. timing pulses and means for causing them to produce timing marks on said other fast-sweep trace which is produced by the first fast-sweep deflecting wave whereby the operation of said chain of frequency dividers may be checked by counting said 500 $\mu$s. timing marks.

11. In a navigation system wherein periodically recurring radio pulses are radiated from A and B ground stations as A and B pulses, respectively, with the B pulses occurring at a predetermined time following the mid-point of the period of the A pulses, a receiver for receiving said A and B pulses, a cathode-ray deflecting circuit for producing successively at a certain repetition period pairs of sequentially occurring slow-sweep deflecting waves, a second cathode-ray deflecting circuit for producing successively at said repetition period pairs of sequentially occurring identical fast-sweep deflecting waves having decreasing slope from at least near the start of the wave, means for deflecting a cathode ray by said slow-sweep waves to produce two parallel adjacent slow-sweep cathode-ray traces and for deflecting it by said fast-sweep waves to produce two parallel adjacent fast-sweep cathode-ray traces which are expanded at one end, means for adjusting the starting time of the second of said pair of fast-sweep deflecting waves, means for causing said A and B pulses to appear on said two fast-sweep traces with the A pulse on the trace that is produced by said second fast-sweep deflecting wave whereby said A and B pulses may be aligned by adjusting said starting time, and means for producing timing pulses each having a repetition period that is a sub-multiple of said repetition period of the deflecting waves and including groups of 1000 $\mu$s., 100 $\mu$s. and 10 $\mu$s. timing pulses, and means for causing said 1000 $\mu$s. timing pulses to produce timing marks on at least the second of said slow-sweep traces whereby said 1000 $\mu$s. marks may be counted to determine the time relation of said A and B pulses to a fractional 1000 $\mu$s. interval, means for causing the 1000 $\mu$s. marker pulse that is adjacent to said fractional interval, and also the 100 $\mu$s. marker pulses and the 10 $\mu$s. marker pulses to produce timing marks appearing on the fast-sweep trace that is produced by the second fast-sweep deflecting wave and means for causing a timing pulse to produce a timing mark on the expanded end of the other fast-sweep trace and extending substantially to the trace produced by said second fast-sweep wave whereby it may be utilized as a fixed position cross-hair mark in counting timing marks appearing on the fast-sweep adjustable trace.

12. In a navigation system wherein periodically recurring radio pulses are radiated from A and B ground stations as A and B pulses, respectively, with the B pulses occurring at a predetermined time following the mid-point of the period of the A pulses, a receiver for receiving said A and B pulses, a cathode-ray deflecting circuit for producing successively pairs of sequentially occurring slow-sweep deflecting waves, a second cathode-ray deflecting circuit for producing successively pairs of sequentially occurring identical fast-sweep deflecting waves having decreasing slope from at least near the start of the wave, means for deflecting a cathode ray by said slow-sweep waves to produce two parallel adjacent slow-sweep cathode-ray traces and for deflecting it by said fast-sweep waves to produce two parallel adjacent fast-sweep cathode-ray traces which are expanded at one end, means for adjusting the starting time of the second of said pair of fast-sweep deflecting waves, means for causing said A and B pulses to appear on said two fast-sweep traces with the A pulse on the trace that is produced by said second fast-sweep deflecting wave whereby said A and B pulses may be aligned by adjusting said starting time, and means for producing timing pulses including groups of 1000 $\mu$s., 100 $\mu$s. and 10 $\mu$s. timing pulses, and means for causing said 1000 $\mu$s. timing pulses to produce timing marks on at least one of said slow-sweep traces whereby said 1000 $\mu$s. marks may be counted to determine the time relation of said A and B pulses to a fractional 1000 $\mu$s. interval, means for causing the 1000 $\mu$s. marker pulse that is adjacent to said fractional interval, and also the 100 $\mu$s. marker pulses and the 10 $\mu$s. marker pulses to produce timing marks appearing on the fast-sweep trace produced by the second fast-sweep deflecting wave and means for producing 50 $\mu$s. timing pulses and causing them to produce timing marks on the other fast-sweep trace with one of the 50 μs. marks appearing on the expanded end of said other fast-sweep trace and extending substantially to the trace produced by said second fast-sweep wave whereby said one 50 μs. mark may be utilized as a fixed position cross-hair mark in counting timing marks appearing on the fast-sweep adjustable trace.

13. Apparatus for measuring the time relation of one group of periodically recurring received pulses with respect to another group of periodically recurring received pulses where both groups of pulses have the same repetition period, comprising means for producing two successive slow-sweep cathode-ray deflecting waves starting at the same voltage level and each of identical slope and having a total repetition period equal to that of said groups of pulses, means for producing groups of timing pulses each group having a different repetition period and having a fixed time relation to the start and finish of the cycle of said two deflecting waves, means including an operation position switch for causing each of said deflecting waves to produce a cathode-ray trace and means for causing a pulse of each group of received pulses to appear on at least one of said two cathode-ray traces, means for producing two successive fast-sweep cathode-ray deflecting waves each starting from the same voltage level and each of identical slope and the two fast-sweep waves having a total repetition period equal to that of said received pulses, means including said operation position switch for causing each of said fast-sweep deflecting waves to produce a cathode-ray trace and means for causing a pulse of each group of received pulses to appear on said two fast-sweep cathode-ray traces, respectively, means for changing the start of the second fast-sweep deflecting wave of said deflecting wave cycle until said received pulses on said traces are in substantially exact alignment or coincidence, switching means for causing at least one of the longer-repetition-period groups of timing pulses to produce timing marks on at least one of said slow-sweep traces whereby from the resulting timing marks an operator may determine within a fraction of said longer repetition period or interval the amount that the start of said second fast-sweep wave is shifted in time with respect to said mid-point of the full deflecting wave cycle, switching means for causing at least two of said groups of timing pulses and the longer-repetition-period pulse adjacent to said fractional interval to produce timing marks on the fast-sweep trace produced by said second fast-sweep deflecting wave and for causing a timing pulse having a repetition period less than said longer repetition period to appear as a cross-hair mark on the trace produced by the first fast-sweep deflecting wave, whereby an operator may count from the timing mark produced on the second fast-sweep trace by said pulse adjacent to said fractional interval over to said cross-hair mark to determine said fractional interval, said fast-sweep waves being shaped to expand the fast-sweep traces in the region of said fractional repetition period as compared with the remaining portions of the fast-sweep traces.

14. In a navigation system wherein periodically recurring radio pulses are radiated from A and B ground stations as A and B pulses, respectively, with the B pulses occurring at a predetermined time following the mid-point of the period of the A pulses, the method of measuring the time interval between the A and B pulses as they appear at a point remote from said ground stations which comprises receiving said A and B pulses at said point, successively producing pairs of sequentially occurring slow-sweep deflecting waves, and producing a periodically recurring pulse that is adjustable in time with respect to the first of said slow-sweep waves, deflecting a cathode ray successively by said waves to produce two parallel adjacent cathode-ray traces, causing said A and B pulses to appear on at least one of said traces with the B pulse near the start of the trace produced by the first wave of said pair, thereby establishing a certain time relation between the B pulse and a time reference point, adjusting the timing of said adjustable pulse to establish the same time relation between the A pulse and said adjustable pulse as said previously established time relation between the B pulse and its time reference point, successively producing pairs of sequentially occurring fast-sweep deflecting waves having decreasing slope from at least near the start of the wave and which are identical throughout their useful deflecting portions, the start of the second fast-sweep wave being initiated by said adjustable pulse, deflecting said cathode ray successively by said fast-sweep waves to produce two parallel adjacent fast-sweep cathode-ray traces whereby said A and B pulses appear on said two traces with the A pulse on the trace that is produced by the second of said pair of deflecting waves, and producing timing marks on at least one of the traces produced by said slow-sweep deflecting waves and also on the traces produced by said fast-sweep deflecting waves whereby the time difference between a time reference point and the starting time of said adjustable pulse may be determined.

15. The method of measuring the time relation of one group of periodically recurring received pulses with respect to another group of periodically recurring received pulses where both groups of pulses have the same repetition period, said method comprising the steps of producing two successive slow-sweep cathode ray deflecting waves each starting from the same voltage level and each of identical slope but of adjustable duration and having a total repetition period equal to that of said received pulses, producing groups of timing pulses having a fixed time relation to the start and finish of the cycle of said two deflecting waves, the repetition period of each group of timing pulses having a decimal relation to the repetition periods of the other groups of timing pulses causing each of said deflecting waves to produce a slow cathode-ray trace and causing a received pulse of each group of received pulses to appear on said two cathode-ray traces, respectively, changing the start of the second deflecting wave of said cycle with respect to the mid-point of the full deflecting wave cycle until said pulses on said traces are approximately in alignment or coincidence, also producing two successive fast-sweep cathode-ray deflecting waves each starting from the same voltage level and each of identical slope and the two fast-sweep waves having a total repetition period equal to that of said received pulses, causing each of said fast-sweep deflecting waves to produce a cathode-ray trace and causing a pulse of each group of received pulses to appear on said two fast-sweep cathode-ray traces, respectively, changing the start of the second fast-sweep deflecting wave of said deflecting wave cycle with respect to said mid-point of the full deflecting wave cycle until said received pulses on said traces are in substantially exact alignment or coincidence, causing at least one of said groups of timing pulses to produce timing marks on at least the second of said slow-sweep traces, blanking out said second deflecting wave from said mid-point to the end of said cycle whereby the timing marks on the remainder of the slow-sweep trace produced by said second deflecting wave indicate within a certain fractional time interval the amount of time that the start of said second slow-sweep wave is shifted with respect to said mid-point of the full deflecting wave cycle, causing at least two of said groups of timing pulses to produce timing marks on the fast-sweep trace produced by said second fast-sweep deflecting wave, causing a timing pulse from the one of said two groups having the longer repetition period to appear as a cross-hair marker on the trace produced by the first fast-sweep deflecting wave, and counting from a certain timing marker on the trace produced by said second fast-sweep wave to said cross-hair marker to determine said fractional time interval, said certain timing marker being the one produced by the first occurring longer-repetition-period pulse which follows in time sequence the pulse producing said cross-hair marker and which is the same pulse that produces the first occurring timing mark on said remainder of the slow-sweep trace.

16. In a system for measuring the time relation of one group of periodically recurring received pulses with respect to another group of periodically recurring received pulses where both groups of pulses have the same repetition period, said system comprising means for producing two successive slow-sweep cathode-ray deflecting waves each of identical slope and starting from the same voltage level, said pair of waves having a repetition period equal to that of said received pulses, means for producing groups of timing pulses having a fixed time relation to the start and finish of the cycle of said pair of deflecting waves, the repetition period of the several groups of timing pulses having a decimal relation to each other, means for causing each of said slow-sweep deflecting waves to produce a slow-sweep cathode-ray trace and means for causing a pulse of each group of received pulses to appear on said two slow-sweep cathode-ray traces, respectively, means for changing the start of the second slow-sweep deflecting wave of said cycle with respect to the mid-point of said cycle until the received pulses on said traces are approximately in alignment or coincidence, means for also producing two successive fast-sweep cathode-ray deflecting waves each starting from the same voltage level and each of identical slope, said pair of fast-sweep waves having a repetition period equal to that of said received pulses, means for causing each of said fast-sweep deflecting waves to produce a cathode-ray trace and means for causing a pulse of each group of received pulses to appear on said two fast-sweep cathode-ray traces, respectively, means for changing the start of the second fast-sweep deflecting wave of said deflecting wave cycle with respect to said mid-point of the full deflecting wave cycle until said received pulses on said traces are in substantially exact alignment or coincidence, means for causing at least one of said groups of timing pulses to produce timing marks on at least the second of said slow-sweep traces, means for blanking out said second deflecting wave from said mid-point to the end of said cycle whereby the timing marks on the remainder of the slow-sweep trace produced by said second deflecting wave indicate within a certain fractional time interval the amount of time that the start of said second slow-sweep wave is shifted with respect to said mid-point of the full deflecting wave cycle, means for causing at least two of said groups of timing pulses to produce timing marks on the fast-sweep trace produced by said second fast-sweep deflecting wave, means for causing a timing pulse from the one of said two groups having the longer repetition period to appear as a cross-hair marker on the trace produced by the first fast-sweep deflecting wave, whereby an operator may count from a certain timing marker on the trace produced by said second fast-sweep wave to said cross-hair marker to determine said fractional time interval, said certain timing marker being the one produced by the first occurring longer-repetition-period pulse which follows in time sequence the pulse producing said cross-hair marker and which is the same pulse that produces the first occurring timing mark on said remainder of the slow-sweep trace.

17. In a system for measuring the time relation of one group of periodically recurring received pulses with respect to another group of periodically recurring received pulses where both groups of pulses have the same repetition period, said system comprising means for producing two successive slow-sweep cathode-ray deflecting waves each of identical slope and starting from the same voltage level, said pair of waves having a repetition period equal to that of said received pulses, means for producing groups of timing pulses having a fixed time relation to the start and finish of the cycle of said pair of deflecting waves, the repetition period of the several groups of timing pulses having a decimal relation to each other, means for causing each of said slow-sweep deflecting waves to produce a slow-sweep cathode-ray trace and means for causing a pulse of each group of received pulses to appear on said two slow-sweep cathode-ray traces, respectively, means for changing the start of the second slow-sweep deflecting wave of said cycle with respect to the mid-point of said cycle until the received pulses on said traces are approximately in alignment or coincidence, means for also producing two successive fast-sweep cathode ray deflecting waves each starting from the same voltage level and each of identical slope, said pair of fast-sweep waves having a repetition period equal to that of said received pulses, means for causing each of said fast-sweep deflecting waves to produce a cathode-ray trace and means for causing a pulse of each group of received pulses to appear on said two fast-sweep cathode-ray traces, respectively, means for changing the start of the second fast-sweep deflecting wave of said deflecting wave cycle with respect to said mid-point of the full deflecting wave cycle until said received pulses on said traces are in substantially exact alignment or coincidence, means for causing at least one of said groups of timing pulses to produce timing marks on at least the second of said slow-sweep traces, means for blanking out said second deflecting wave from said mid-point to the end of said cycle whereby the timing marks on the remainder of the slow-sweep trace produced by said second deflecting wave indicate within a certain fractional time interval the amount of time that the start of said second slow-sweep wave is shifted with respect to said mid-point of the full deflecting wave cycle, means for causing at least two of said groups of timing pulses to produce timing marks on the fast-sweep trace produced by said second fast-sweep deflecting wave, means for causing a timing pulse from the one of said two groups having the longer repetition period to appear as a cross-hair marker on the trace produced by the first fast-sweep deflecting wave, whereby an operator may count from a certain timing marker on the trace produced by said second fast-sweep wave to said cross-hair marker to determine said fractional time interval, said certain timing marker being the one produced by the first occurring longer-repetition-period pulse which follows in time sequence the pulse producing said cross-hair marker and which is the same pulse that produces the first occurring timing mark on said remainder of the slow-sweep trace, said means for changing the start of the slow deflecting wave comprising means for changing the timing of the edge of a pulse, the start of both the slow deflecting wave and the fast deflecting wave beginning in response to the occurrence of said pulse edge, and switching means for selectively causing said pulse edge to initiate either the slow-sweep wave or the fast-sweep wave.

18. The method of measuring the time relation of one group of periodically recurring received pulses with respect to another group of periodically recurring received pulses where both groups of pulses have the same repetition period, said method comprising the steps of producing two successive slow-sweep cathode-ray deflecting waves each starting from the same voltage level and each of identical slope but at least one of which having a duration that changes with a change in the starting time of the other of said pair of waves having a total repetition period equal to that of said groups of received pulses, producing groups of timing pulses having a fixed time relation to the start and finish of the cycle of said two deflecting waves each group of pulses having a different repetition rate, causing each of said deflecting waves to produce a slow-sweep cathode-ray trace and causing a pulse of each group of received pulses to appear on said two cathode-ray traces, respectively, changing the start of the second slow-sweep deflecting wave of said cycle with respect to the mid-point of the full deflecting wave cycle until said pulses on said traces are approximately in alignment or coincidence, also producing two successive fast-sweep cathode-ray deflecting waves each starting from the same voltage level and each of identical slope, said slope being of gradually decreasing steepness from the start to the end of the wave, the two fast-sweep waves having a total repetition period equal to that of said received pulses, causing each of said fast-sweep deflecting waves to produce a cathode-ray trace and causing a pulse of each group of received pulses to appear on said two fast-sweep cathode-ray traces, respectively, changing the start of the second fast-sweep deflecting wave of said deflecting wave cycle with respect to said mid-point of the full deflecting wave cycle until said received pulses on said traces are in substantially exact alignment or coincidence, causing at least one of said groups of timing pulses to produce timing marks on at least the second of said slow-sweep traces, blanking out said second deflecting wave from said mid-point to the end of said cycle whereby the timing marks on the remainder of the slow-sweep trace produced by said second deflecting wave indicate within a certain fractional time interval the amount of time that the start of said second slow-sweep wave is shifted with respect to said mid-point of the full deflecting wave cycle, causing at least two of said groups of timing pulses to produce timing marks on the fast-sweep trace produced by said second fast-sweep deflecting wave, causing a timing pulse from the one of said two groups having the longer repetition period to appear as a cross-hair marker on the trace produced by the first fast-sweep deflecting wave, and counting from a certain timing marker on the trace produced by said second fast-sweep wave to said cross-hair marker to determine said fractional time interval, said certain timing marker being the one produced by the first occurring longer-repetition-period pulse following in time sequence the pulse producing said cross-hair marker and being one that coincides in time with the marker pulse that marks the end of said fractional time interval and the beginning of the next adjacent full time interval counted on the slow sweep.

19. The method of measuring the time relation of one group of periodically recurring received pulses with respect to another group of periodically recurring received pulses where both groups of received pulses have the same repetition period and where the pulses of one group have a staggered time relation with respect to the pulses of the other group, said method comprising the steps of producing two successive slow-sweep cathode-ray deflecting waves, said pair of deflecting waves having a total repetition period equal to that of said groups of received pulses, producing groups of timing pulses each group having a different repetition period and having a fixed time relation to the start and finish of the cycle of said two deflecting waves, causing each of said deflecting waves to produce a slow cathode-ray trace upon at least one of which a group of said timing pulses may be made to appear, also producing two successive fast-sweep cathode-ray deflecting waves each of which starts simultaneously with the starts of said two slow-sweep waves, respectively, each starting from the same voltage level, and each of identical slope and having a total repetition period equal to that of said groups of received pulses, causing each of said fast-sweep deflecting waves to produce a cathode-ray trace and causing a pulse of each group of received pulses to appear on said two fast-sweep cathode-ray traces, respectively, advancing the start of the second fast-sweep deflecting wave of said cycle with respect to the mid-point of the full deflecting wave cycle until said received pulses on said traces are in exact alignment or coincidence, causing the timing marks having one of the longer repetition periods to appear on at least the second of said slow-sweep traces and counting said last-mentioned timing marks from a certain last occurring mark to a certain first occurring mark to indicate within a certain fractional time interval of said longest repetition period the amount of time that the start of said second fast deflecting wave is advanced with respect to said mid-point of the full deflecting wave cycle, causing the pulse corresponding to said last-counted timing mark and at least one group of pulses having a shorter repetition period than said longer repetition period to appear as timing marks on the fast-sweep trace produced by said second fast-sweep deflecting wave, causing a timing pulse from one of said groups having one of the shorter repetition periods to appear as a cross-hair mark on the first part of the trace produced by the first fast-sweep deflecting wave, and counting from said last-counted timing mark on the trace produced by said second fast-sweep wave to said cross-hair mark to determine said fractional time interval.

20. In a navigation system wherein periodically recurring radio pulses are radiated from A and B ground stations as A and B pulses, respectively, with the B pulses occurring at a predetermined time following the mid-point of the period of the A pulses, the method of measuring the time interval between the A and B pulses as they appear at a point remote from said ground stations which comprises receiving said A and B pulses at said point, producing pairs of periodically recurring pulses, the second pulse of the pair being adjustable in time with respect to the first pulse of the pair, causing said pulses to produce successively pairs of sequentially occurring slow-sweep deflecting waves, the first and second of said waves each occurring in a fixed time relation to the first and second of said pair of pulses, respectively, deflecting a cathode ray successively by said waves to produce two parallel adjacent cathode ray traces, causing said B and A pulses to appear on the traces produced by the first and second waves, respectively, of said pair of deflecting waves, adjusting the timing of said adjustable pulse and thereby aligning said A and B pulses, successively producing pairs of sequentially occurring fast-sweep deflecting waves having decreasing slope from at least near the start of the wave and which are identical throughout their useful deflecting portions, each pair of fast-sweep waves starting at the same time as each pair of slow-sweep waves, the start of the second fast-sweep wave being initiated by said adjustable pulse, deflecting said cathode ray successively by said waves to produce two parallel adjacent cathode-ray traces whereby said A and B pulses appear on said two traces with the A pulse on the trace that is produced by the second of said pair of fast-sweep waves, aligning said A and B pulses more exactly while they are on said fast-sweep traces, and producing timing marks on at least the trace produced by said second slow-sweep deflecting wave and also on the traces produced by said fast-sweep deflecting waves whereby the time difference between a time reference point and the starting time of said adjustable fast-sweep wave may be determined by counting timing marks.

GARRARD MOUNTJOY.
GEORGE D. HULST, Jr.
EARL SCHOENFELD.

REFERENCES CITED

The following references are of record in the file of this patent:

UNITED STATES PATENTS

| Number | Name | Date |
| --- | --- | --- |
| 2,300,189 | Wolff | Oct. 27, 1942 |
| 2,312,761 | Hershberger | Mar. 2, 1943 |
| 2,355,363 | Christaldi | Aug. 8, 1944 |